(12) United States Patent
Takeda

(10) Patent No.: US 7,773,983 B2
(45) Date of Patent: Aug. 10, 2010

(54) APPLICATION FILTERING APPARATUS, SYSTEM AND METHOD

(75) Inventor: Yukiko Takeda, Tokorozawa (JP)

(73) Assignee: Hitachi, Ltd., Tokyo (JP)

( * ) Notice: Subject to any disclaimer, the term of this patent is extended or adjusted under 35 U.S.C. 154(b) by 654 days.

(21) Appl. No.: 11/673,779

(22) Filed: Feb. 12, 2007

(65) Prior Publication Data

US 2008/0004061 A1  Jan. 3, 2008

(30) Foreign Application Priority Data

Jul. 3, 2006  (JP) ............................. 2006-183496

(51) Int. Cl.
*H04M 3/00* (2006.01)
(52) U.S. Cl. ..................... 455/420; 455/419
(58) Field of Classification Search ............... 370/352; 455/414.1, 419–420
See application file for complete search history.

(56) References Cited

U.S. PATENT DOCUMENTS

| 2005/0002381 A1* | 1/2005 | Westman et al. ............ 370/352 |
| 2005/0155036 A1* | 7/2005 | Tiainen et al. .............. 719/310 |
| 2006/0195565 A1* | 8/2006 | De-Poorter ................ 709/224 |
| 2006/0253873 A1* | 11/2006 | Lim et al. ..................... 725/62 |
| 2006/0280169 A1* | 12/2006 | Mahdi ........................ 370/352 |
| 2007/0038723 A1* | 2/2007 | Gourraud .................... 709/218 |
| 2008/0004061 A1* | 1/2008 | Takeda ........................ 455/518 |
| 2008/0176538 A1* | 7/2008 | Terrill et al. ............. 455/414.1 |
| 2008/0212569 A1* | 9/2008 | Terrill et al. ................. 370/352 |
| 2008/0215736 A1* | 9/2008 | Astrom et al. .............. 709/226 |
| 2008/0232352 A1* | 9/2008 | Terrill et al. ................ 370/352 |
| 2009/0089435 A1* | 4/2009 | Terrill et al. ................ 709/227 |

FOREIGN PATENT DOCUMENTS

WO   WO-2006/016846 A1 * 2/2006

OTHER PUBLICATIONS

"3GPP2 X.S0013-002-A v1.0, All-IP core Network Multimedia Domain §4.6", Dec. 2005, retrieved on May 29, 2006 from the Internet, p. URL: <http:www.3gpp2.org/Public_html/specs/X.S0013-002-A_v1.0_051103.pdf.>.
IETF RFC32621, SIP: Session Initiation Protocol §4 Jun. 2006, retrieved on May 29, 2006 from the Internet: URL:http://www.ietf.org/rfc/rfc2161.txt?number=3261.>.

* cited by examiner

*Primary Examiner*—Lewis G West
*Assistant Examiner*—Nathan Taylor
(74) *Attorney, Agent, or Firm*—Brundidge & Stanger, P.C.

(57) ABSTRACT

Provided is an application filtering apparatus for controlling session, which is coupled to a network which is coupled to a plurality of terminal devices, a first server for managing subscriber information of the terminal devices, and a second server for providing a service to the terminal devices, the application filtering apparatus comprising: an interface coupled to the network; a processor coupled to the memory; and a memory coupled to the processor, wherein the application filtering apparatus is configured to: obtain the subscriber information from the first server; obtain, when one of the terminal devices sends a session control message to the second server, an identifier of the terminal device that has sent from the received session control message; and send, based on the obtained subscriber information and the obtained identifier of the terminal device, an instruction to control the service to the second server via the interface.

9 Claims, 26 Drawing Sheets

200 REGISTRATION INFORMATION TABLE (S-CSCF)

| PRIVATE USER IDENTITY /201 | PUBLIC USER IDENTITY /202 | CONTACT /203 | AUTHENTICATION INFORMATION /204 | SERVICE PROFILE /205 | EXPIRE /206 | |
|---|---|---|---|---|---|---|
| UE#1 | sip:user1_public1@home1.net | ue#1 | | | | 200-1 |
| | | | | | | 200-2 |
| | | | | | | 200-n |

*Fig.4A*

210 PSI FILTER INFORMATION TABLE (S-CSCF)

| PUBLIC USER IDENTITY /211 | PSI /212 | |
|---|---|---|
| sip:user1_public1@home1.net | conf1@as1.home1.net | 210-1 |
| sip:user1_public1@home1.net | conference_factory@as1.home1.net | 210-2 |
| | | 210-n |

*Fig.4B*

220 PSI LIST (S-CSCF)

| PUBLIC SERVICE IDENTITY /221 | |
|---|---|
| | 220-1 |
| | 220-2 |
| | 220-n |

*Fig.4C*

240 PSI STATE TABLE (AS)

| PUBLIC SERVICE IDENTITY | STATE | EXPIRE | |
|---|---|---|---|
| conf1@as1.home1.net | ACTIVE | yy/mm/dd | 240-1 |
| | | | 240-2 |
| | | | 240-n |

*Fig.5A*

250 SUBSCRIBER LIST (AS)

| PUBLIC SERVICE IDENTITY | PUBLIC USER IDENTITY | | |
|---|---|---|---|
| conf1@as1.home1.net | sip:user1_public1@home1.net<br>sip:user2_public1@home1.net | | 250-1 |
| | | | 250-2 |
| | | | 250-n |

*Fig.5B*

APPLICATION FILTERING APPARATUS, SYSTEM AND METHOD

CLAIM OF PRIORITY

The present application claims priority from Japanese patent application 2006-183496 filed on Jul. 3, 2006, the content of which is hereby incorporated by reference into this application.

BACKGROUND OF THE INVENTION

This invention relates to a communication device connected to a network, a communication system, and a communication control method. More specifically, the technique relates to a session control device and a communication access control method, in particular, a session control device in a communication system to which Session Initiation Protocol (SIP) is applied and an application control method in a communication system to which an application server device is applied.

Third-generation mobile communication systems aim for quicker and better access to text, audio, video, and other various multimedia services. At present, the 3rd Generation Partnership Project (3GPP), and the 3rd Generation Partnership Project 2 (3GPP2) are working toward standardization of "All-IP-based mobile communication network" in order to provide, over packet switched networks, multimedia services that make use of an Internet Protocol (IP) technology. An all-IP-based mobile communication network is called an IP multimedia subsystem (IMS) in 3GPP, and a multimedia domain (MMD) in 3GPP2.

In an IP multimedia subsystem (IMS), a function named Call Session Control Function (CSCF) executes All-IP network session control, and a server called Home Subscriber Server (HSS) keeps subscriber information. An application is provided in the IMS by an application server (AS).

There are roughly three types of CSCF classified by their roles, P-CSCF, I-CSCF, and S-CSCF. P-CSCF, which stands for Proxy-CSCF, is a CSCF that is accessed by a mobile terminal first. I-CSCF, which stands for Interrogating-CSCF, identifies which S-CSCF is assigned to the mobile terminal. S-CSCF, which stands for Serving-CSCF, is placed in a home network to control and manage the session state (see, for example, "3GPP2 X.S0013-002-A v1.0, All-IP Core Network Multimedia Domain §4.6", December 2005, retrieved on May 29, 2006 from the Internet, page URL: <http://www[dot]3gpp2[dot]org/Public_html/specs/X.S0013-002-A_v1.0_051103.pdf>)("[dot]"=".").

Session Initiation Protocol (SIP) is employed as a session control protocol (see, for example, IETF RFC3261, "SIP: Session Initiation Protocol §4", June 2006, retrieved on May 29, 2006 from the Internet: <URL: http://www[dot]ietf[dot]org/rfc/rfc3261.txt?number=3261>)("[dot]"="."). SIP is a protocol specified by IETF to control IP multimedia communication sessions. A typical example of services that use SIP is Voice over IP (VoIP). VoIP is a technology for transmission and reception of audio information over IP networks. In VoIP communications according to SIP, a virtual communication path (session) is set between communication devices before a communication is started. Audio data is transferred in the form of IP packets along the set communication path. SIP controls establishment, maintenance, and disconnection of a session between communication devices in VoIP communications.

Media information such as attributes of audio data is determined at the time a session is established. A communication device notifies media information following Session Description Protocol (SDP) which is contained in an SIP message. According to SDP, various kinds of session-related information (e.g., IP address, port number, and media type) can be described.

IMS presents roughly two types of AS activation methods. One is to use a service activation condition contained in subscriber information, and the other is to use Public Service Identity (PSI), in other words, application identifier. PSI is set beforehand in some cases, and is created dynamically in other cases.

The AS activation method that uses a service activation condition in subscriber information will be described first.

An HSS holds subscriber information (service profile) for each user authentication identifier. An S-CSCF obtains the subscriber information from the HSS upon location registration. Subscriber information of a user who subscribes to an application contains "Initial Filter Criteria". The S-CSCF processes "Initial Filter Criteria" upon reception of the first SIP request, and judges whether to activate an AS.

The AS activation method that uses PSI will be described next.

Public Service Identity (PSI) is an identifier for identifying an application that is provided by an AS. PSI is used in order to identify a group that multiple users join, such as a forum.

SUMMARY OF THE INVENTION

No S-CSCF in mobile communication systems of the prior art manages PSI information that is created dynamically. Therefore, an S-CSCF in a conventional mobile communication system does not perform application filtering or any other access control that utilizes dynamically-created PSI.

An S-CSCF according to the prior art is considered to take the following application activation method.

First, a terminal called User Equipment (UE) performs SIP location registration in the S-CSCF via a P-CSCF and an I-CSCF. The S-CSCF obtains subscriber information (user profile) from an HSS at this point. The subscriber information sometimes contains information about an application to which the UE subscribes but, conventionally, it is information statically set in the HSS.

The UE next issues an SIP session establishment request. The SIP session establishment request sometimes contains the identifier (SIP URI) of an AS but, conventionally, the AS identifier is set in advance.

Upon reception of the SIP session establishment request, the S-CSCF refers to the subscriber information and grants access to the AS. The subscriber information sometimes contains AS information but, conventionally, the S-CSCF obtains AS information from the HSS upon location registration.

The S-CSCF sends the SIP session establishment request to the AS. The AS creates a temporary identifier (for example, identifier of a forum) dynamically, and sends a response message containing this identifier to the UE via the S-CSCF. Although the response message is forwarded by the S-CSCF, the S-CSCF does not have information on the identifier dynamically allocated by the AS, and cannot perform access control (e.g., filtering) with the use of the identifier dynamically allocated by the AS.

An example of resultant problems is that, when an identifier designated by the UE as the destination of an SIP message (request URI) is not the correct identifier assigned to the AS, the S-CSCF still grants the UE access to the AS.

This invention has been made in view of the above, and it is therefore an object of this invention to provide access control that uses dynamically created identifiers. More specifically, an object of this invention is to provide a communication method for controlling access to an application server (AS) in an IP-based mobile communication network when an S-CSCF receives a request from a terminal.

A representative aspect of this invention is as follows. That is, there is provided an application filtering apparatus for controlling session, which is coupled to a network which is coupled to a plurality of terminal devices, a first server for managing subscriber information of the terminal devices, and a second server for providing a service to the terminal devices, the application filtering apparatus comprising: an interface coupled to the network; a processor coupled to the memory; and a memory coupled to the processor, wherein the application filtering apparatus is configured to: obtain the subscriber information from the first server; obtain, when one of the terminal devices sends a session control message to the second server, an identifier of the terminal device that has sent from the received session control message; and send, based on the obtained subscriber information and the obtained identifier of the terminal device, an instruction to control the service to the second server via the interface.

According to an aspect of this invention, access to an application server with the use of an invalid application identifier can be prevented.

BRIEF DESCRIPTION OF THE DRAWINGS

The present invention can be appreciated by the description which follows in conjunction with the following figures, wherein:

FIG. 4A is an explanatory diagram showing a configuration example of a registration information table of the first embodiment of this invention;

FIG. 4B is an explanatory diagram showing a configuration example of a PSI filter information table of the first embodiment of this invention;

FIG. 4C is an explanatory diagram showing a configuration example of the PSI list table of the first embodiment of this invention;

FIG. 5A is an explanatory diagram showing a configuration example of the PSI state table of the first embodiment of this invention;

FIG. 5B is an explanatory diagram showing a configuration example of the subscriber list of the first embodiment of this invention;

DETAILED DESCRIPTION OF THE PREFERRED EMBODIMENTS

A first embodiment of this invention will be described with reference to drawings.

A detailed description will be given as a representative example on a communication method that is employed when a mobile terminal uses an application of a home network.

Figure 1:
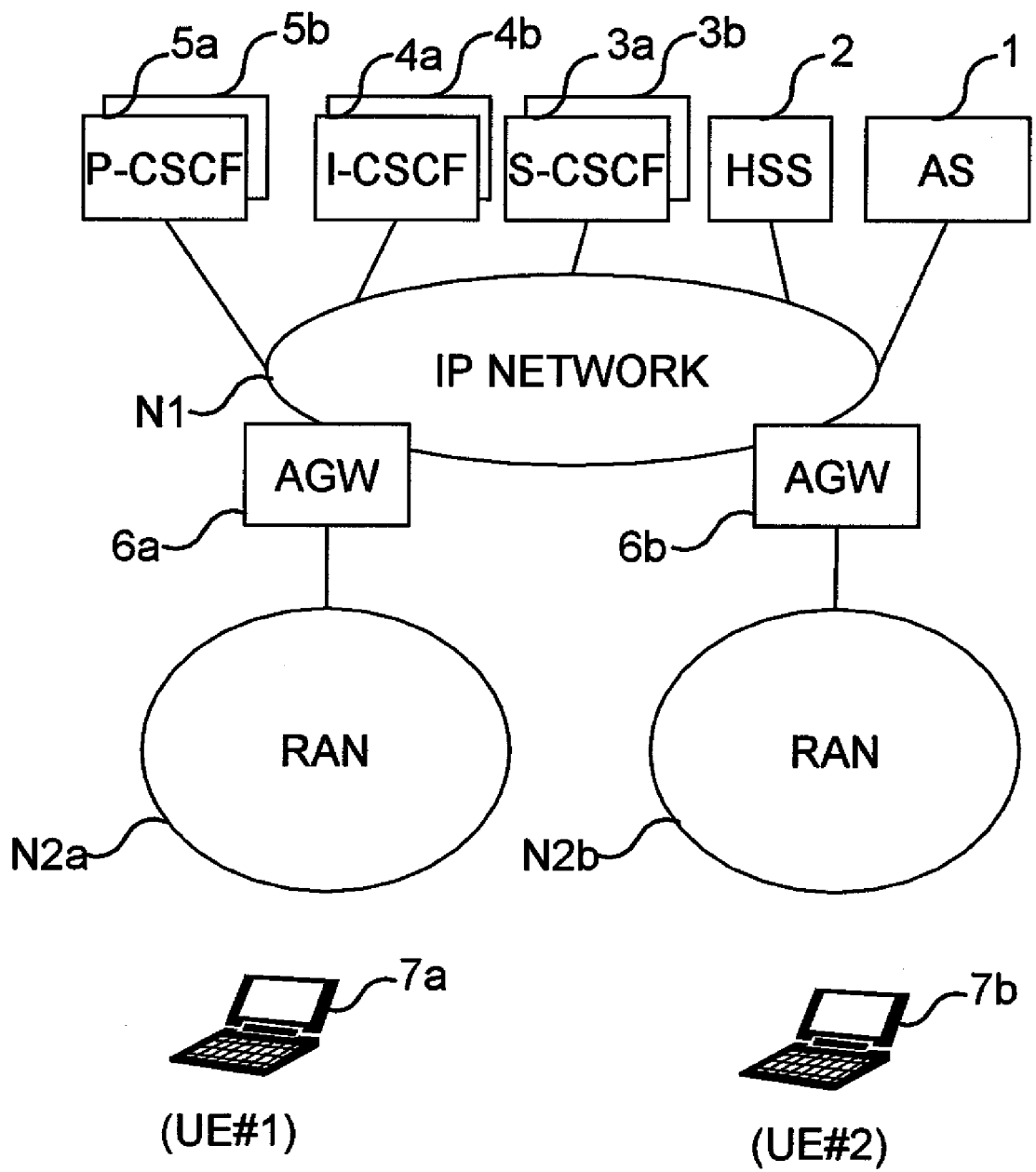
FIG. 1 is an explanatory diagram showing a configuration example of a communication network of a first embodiment of this invention.

FIG. 1 is an explanatory diagram showing a configuration example of a communication network according to the first embodiment of this invention.

The communication network in this embodiment is composed of an IP network N1 and wireless access networks N2

(N2*a*, N2*b*) (RAN: Radio Access Network). A UE 7 is a terminal compliant with a third-generation mobile communication protocol. The wireless access networks N2 may be landline networks and the UE 7 may be a landline terminal or a wireless terminal compliant with other mobile communication protocols than third-generation mobile communication protocols, for example, wireless LAN, as long as such modifications to the communication network configuration do not impair the effects of this invention.

The example shown in FIG. 1 has two UEs 7, which are, in the following description, when necessary, discriminated from each other with a suffix "a" or "b" attached to the reference symbol, as in "UE 7*a*" and "UE 7*b*". The same rule applies also to other components than the UE 7. The UE 7*a* and the UE 7*b* are respectively identified by private user identities UE#1 and UE#2, which will be described later.

The IP network N1 is connected with the RANs N2 via access gate way devices (AGW) 6 (6*a*, 6*b*). Other communication devices than the access gateway devices 6, for example, routers, may connect the IP network N1 with the RANs N2. Each access gateway device 6 provides a function of transferring IP packets that are exchanged between the UE 7 and the IP network N1.

The IP network N1 has an AS 1, an HSS 2, S-CSCFs 3 (3*a*, 3*b*), I-CSCFs 4 (4*a*, 4*b*), and P-CSCFs 5 (5*a*, 5*b*).

The AS 1 has a function of controlling execution of an application.

The HSS 2 keeps subscriber information, which contains, for example, authentication information of the UE 7 and information on an application to which the UE 7 subscribes. The subscriber information is referred to in order to judge for each UE 7 whether or not the UE 7 is entitled to receive a service provided by the AS 1.

The P-CSCF 5, the I-CSCF 4, and the S-CSCF 3 have session control functions. The P-CSCF 5 is a CSCF that the UE 7 accesses first. The I-CSCF 4 has a function of identifying which S-CSCF 3 is used by the UE 7. The S-CSCF 3 has a function of controlling and managing the session state of the UE 7.

The UE 7 has a mobile communication function and a function of processing SIP. The UE 7 holds SIP URI as an SIP identifier.

The example shown in FIG. 1 has two S-CSCFs 3, I-CSCFs 4, P-CSCFs 5, AGWs 6, RANs N2, and UEs 7, each. However, there can be as many of those components as desired in carrying out this invention.

Figure 2:
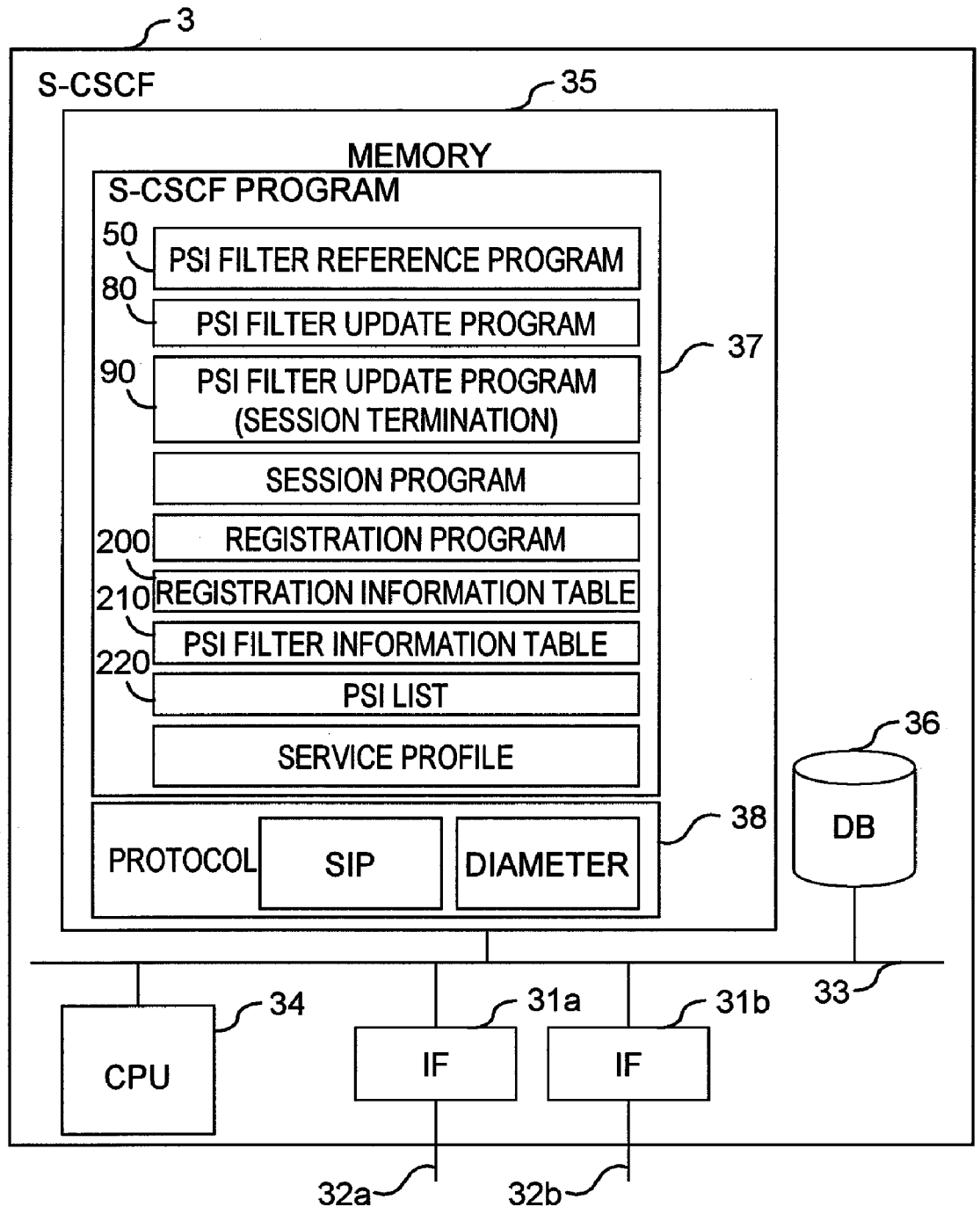
FIG. 2 is an explanatory diagram showing a configuration example of the S-Call Session Control Function (S-CSCF) of the first embodiment of this invention.

FIG. 2 is an explanatory diagram showing a configuration example of the S-CSCF 3 according to the first embodiment of this invention.

The S-CSCF 3 is composed of interface units (IFs) 31 (31*a*, 31*b*), a CPU 34, a memory 35, and a database (DB) 36. The interface units 31 accommodate lines 32 (32*a*, 32*b*). The components of the S-CSCF 3 are connected to one another by a bus 33.

The memory 35 stores a program 38, which executes protocol processing, and a program 37, which executes S-CSCF processing. The memory 35 may further store other programs.

The CPU 34 is a processor that executes the programs stored in the memory 35. In the following description, processing performed by the S-CSCF 3 is actually executed by the CPU 34 running one of the programs.

The program 38 which executes protocol processing contains a program that executes SIP signal control and a program that executes DIAMETER signal control. The program that executes SIP signal control has a function of enabling the S-CSCF 3 to exchange signals with a communication device that is located in the IP network N1. The program that executes DIAMETER signal control has a function of enabling the S-CSCF 3 to exchange signals with the HSS 2.

The program 37 which executes S-CSCF processing contains processing programs that are used in referring to or updating application filtering information (PSI filter reference program 50, PSI filter update program 80, and session end PSI filter update program (PSI filter update program session termination) 90), a processing program that executes session processing (session program), and a processing program that executes location registration processing (registration program). The program 37 also contains a registration information table 200 where location registration information of the UE 7 is stored, a PSI filter information table 210 where PSI filter information is stored, a PSI list 220 which is used to manage information on the correlation between a PSI identifier and an application server, and a service profile of the UE 7 whose location has been registered. The PSI filter information table 210, the PSI list 220, and the service profile may be contained in the database 36 instead. PSI, which stands for Public Service Identity, serves as an application identifier.

Having the PSI filter reference program 50, the PSI filter update program 80, the session end PSI filter update program 90, and the PSI filter information table 210, the S-CSCF 3 is capable of controlling access to an application.

FIG. 4A is an explanatory diagram showing a configuration example of the registration information table 200 according to the first embodiment of this invention.

The S-CSCF 3 refers to and updates the registration information table 200 when executing terminal location registration processing.

The registration information table 200 holds at least a private user identity 201, a public user identity 202 associated with the private user identity 201, a contact 203, authentication information 204, and a service profile 205. The private user identity 201 is an identifier used in authentication of the UE 7. The public user identity 202 is the public address of the UE 7. The contact 203 is a connection destination address.

At the time the location of the UE 7 is registered, the S-CSCF 3 obtains, from the HSS 2, the authentication information 204 and service profile 205 of the UE 7 whose location is to be registered.

The registration information table 200 may further contain an expiration date 206. In the case where the registration information table 200 contains the expiration date 206, the S-CSCF 3 can delete an entry whose expiration date 206 has expired.

In the example of FIG. 4A, an entry 200-1 holds "UE#1" as the private user identity 201, "sip:user1_public1@home1.net" is held as the public user identity 202 of the entry 200-1, and "ue#1" is held as the contact 203 of the entry 200-1. This entry corresponds to the UE 7*a* shown in FIG. 1.

FIG. 4B is an explanatory diagram showing a configuration example of the PSI filter information table 210 according to the first embodiment of this invention.

The S-CSCF 3 refers to the PSI filter information table 210 when sending a message to the AS 1. The PSI filter information table 210 holds at least the correlation between a public user identity 211 of each UE 7 and a PSI 212 allocated to the UE 7. Stored as the PSI 212 is the identifier of a server that provides a service to the UE 7 (for example, AS 1), or the identifier of a service provided by the server.

In the example of FIG. 4B, an entry 210-1 holds "sip:user1_public1@home1.net" as the public user identity 211, and "conf1@as1.home1.net", which is the identifier of a forum provided by the AS 1, is held as the PSI 212 of the entry 210-1. The entry 210-1 indicates that the UE 7a identified by "sip:user1_public1@home1.net" is granted access to the forum "conf1@as1.home1.net" provided by the AS 1. The S-CSCF 3 in this case allows a message that is sent from the UE 7a and destined to the address "conf1@as1.home1.net" in the AS 1 a passage. Processing of the S-CSCF 3 executed in allowing the message a passage will be described later in detail with reference to FIG. 12 and other drawings.

In the example of FIG. 4B, an entry 210-2 holds "sip: user1_public1@home1.net" as the public user identity 211, and "conference_factory@as1.home1.net", which is the identifier of a conference server provided by the AS 1, is held as the PSI 212 of the entry 210-2. The entry 210-2 indicates that the UE 7a is granted access to the conference server "conference_factory@as1.home1.net" provided by the AS 1. The S-CSCF 3 in this case allows a message that is sent from the UE 7a and destined to the address "conference_factory@as1.home1.net" in the AS 1 a passage.

FIG. 4C is an explanatory diagram showing a configuration example of the PSI list table 220 according to the first embodiment of this invention.

The S-CSCF 3 refers to the PSI list table 220 when sending a message to the AS 1. The PSI list table 220 holds a PSI 221 as the destination of a message that is allowed a passage by the S-CSCF 3.

Figure 3:
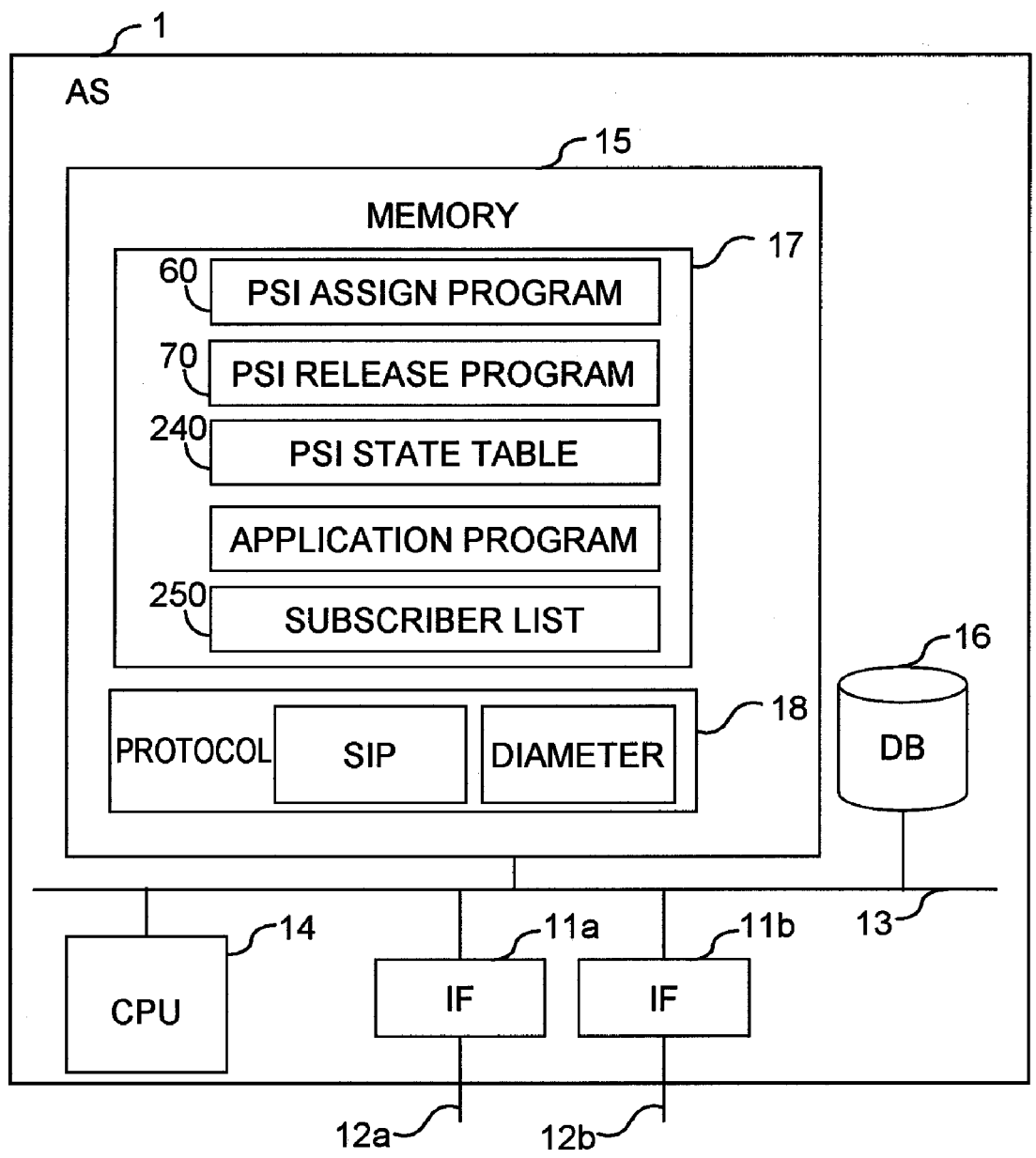
FIG. 3 is an explanatory diagram showing a configuration example of an application server (AS) of the first embodiment of this invention.

FIG. 3 is an explanatory diagram showing a configuration example of the application server (AS) 1 according to the first embodiment of this invention.

FIG. 3 specifically shows a configuration example of the AS 1 that provides a conference service. The AS 1 can provide other application services (e.g., Push to Talk and Instant Message) than the conference service as long as the effects of this invention are not impaired.

The AS 1 is composed of interface units (IFs) 11 (11a, 11b), a CPU 14, a memory 15, and a database (DB) 16. The interface units 11 accommodate lines 12 (12a, 12b). The components of the AS 1 are connected to one another by a bus 13.

The memory 15 stores a program 18, which executes protocol processing, and a program 17, which executes application execution control. The memory 15 may further store other programs.

The CPU 14 is a processor that executes the programs stored in the memory 15. In the following description, processing performed by the AS 1 is actually executed by the CPU 14 running one of the programs.

The program 18 which executes protocol processing contains a program that executes SIP signal control and a program that executes DIAMETER signal control. The program that executes SIP signal control has a function of enabling the AS 1 to exchange signals with a communication device that is located in the IP network N1. The program that executes DIAMETER signal control has a function of enabling the AS 1 to exchange signals with the HSS 2.

The program 17 which executes application execution control contains a PSI assign program 60, a PSI release program 70, a PSI state table 240, a processing program for controlling execution of each application separately (application processing program), and a subscriber list 250.

The PSI assign program 60 and the PSI release program 70 respectively have functions of enabling the AS 1 to allocate or deallocate an application identifier dynamically during activation of an application. The application processing program has a function of controlling execution of, for example, a conference service.

The PSI state table 240 and the subscriber list 250 may be contained in the database 16 instead.

Having the PSI assign program 60, the PSI release program 70, the PSI state table 240, and the subscriber list 250, the AS 1 is capable of setting a PSI that is allocated to a user or the like in a relevant entry of the PSI state table 240 while execution of an application is controlled.

FIG. 5A is an explanatory diagram showing a configuration example of the PSI state table 240 according to the first embodiment of this invention.

The PSI state table 240 holds at least the correlation between a PSI 241 that the AS 1 allocates during application processing and a state 242 of the PSI 241. Stored as the state 242 is a value indicating the state of each PSI, such as "Active", "Inactive", or "Temporarily Allocated". For example, an entry 240-1 in FIG. 5A shows that a value "conf1.@as1.home1.net" of the PSI 241 is associated with a value "Active" of the state 242.

The PSI state table 240 may contain an expiration 243 indicating when an entry expires. In the case where the PSI state table 240 contains the expiration 243, the AS 1 can delete an entry that has passed the expiration 243 from the table 240.

FIG. 5B is an explanatory diagram showing a configuration example of the subscriber list 250 according to the first embodiment of this invention.

The subscriber list 250 holds the correlation between a PSI 251 and a public address (public user identity) 252 allocated to a user who subscribes to an application that is indicated by the PSI 251. For instance, an entry 250-1 shows that a value "conf1.@as1.home1.net" of the PSI 251 is associated with values "sip:user1_public1@home1.net" and "sip:user2_public1@home1.net" of the public user identity 252.

The format of Internet Protocol version 6 (IPv6) packets will be described next. An IPv6 packet is composed of an IPv6 base header, an IPv6 extension header which follows the base header, and a payload which follows the base and extension headers. The IPv6 base header contains a source address and a destination address. Packets in the following description are IPv6 packets having this format. Instead, packets compliant with other protocols than IPv6, for example, Internet Protocol version 4 (IPv4) packets, may be employed as long as the effects of this invention are not impaired.

A packet format containing an SIP message will be described next. An SIP message is stored in the data section of a transport protocol such as TCP/UDP. The header and data section of the transport protocol are stored in the payload of the IPv6 packet format.

Described next is the format of SIP messages.

An SIP message is composed of, at least, a start-line which indicates whether the SIP message is a request or a response, and a message-header in which a parameter of the SIP message is set. When information such as media information used in communications between terminals is transmitted in the form of an SIP message, the SIP message contains a message-body in which the media information or the like is stored.

A packet format containing a DIAMETER message will be described next. A DIAMETER message is stored in the data section of a transport protocol such as TCP/SCTP. The header and data section of the transport protocol are stored in the payload of the IPv6 packet format.

Next, a description will be given with reference to FIGS. 6, 7, 8, and 9 on a sequence in which the UE 7a having a private user identity "UE#1" and located in the RAN N2a of FIG. 1 performs IMS location registration to register its location in the S-CSCF 3a, and a conference service is activated between the UE 7a and the UE 7b having private user identities "UE#1" and "UE#2", respectively.

Figure 6:
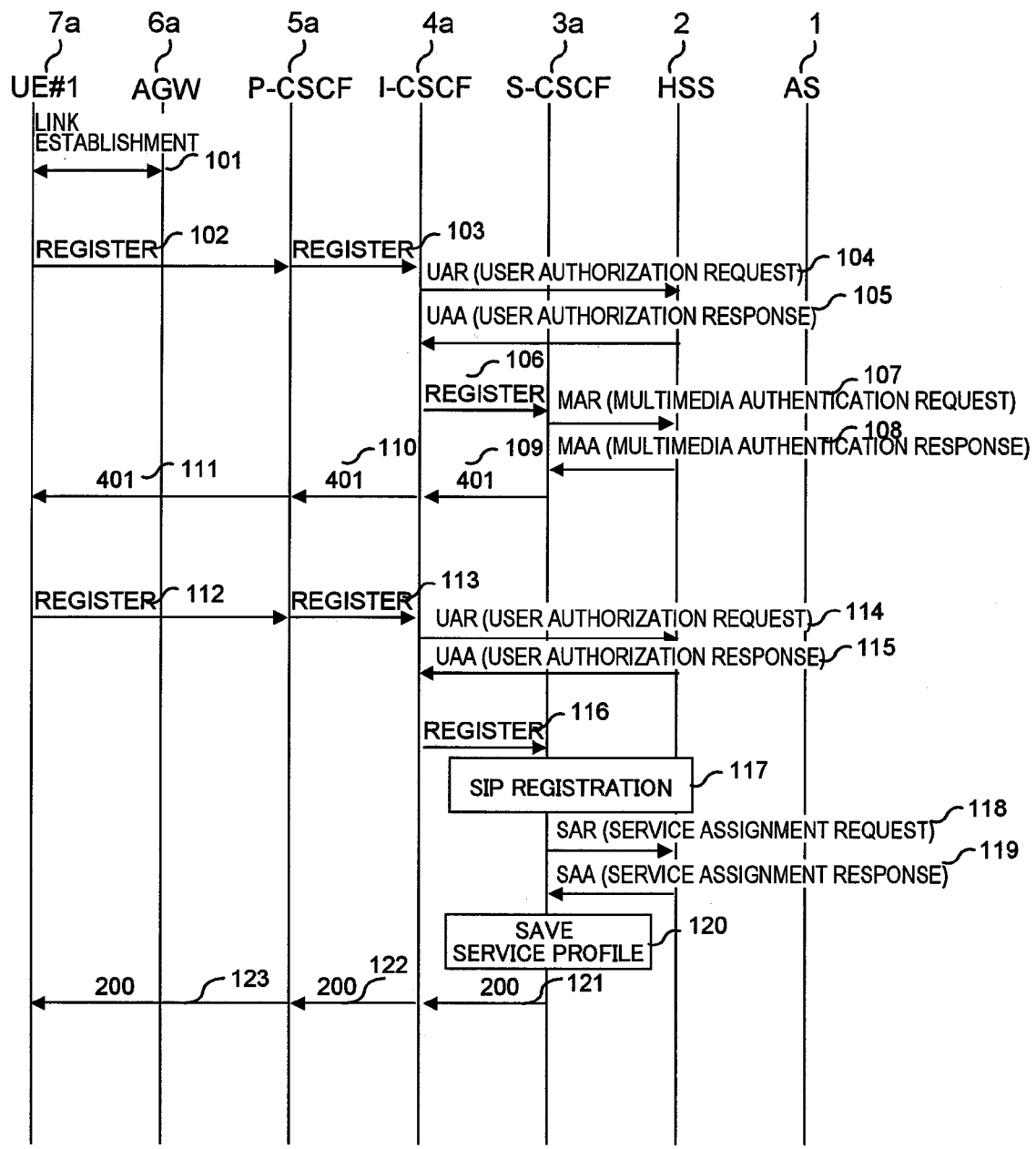
FIG. 6 is a sequence diagram showing a registering procedure of location of a first user equipment (UE) according to the first embodiment of this invention.

FIG. 6 is a sequence diagram illustrating a procedure through which the UE 7a (UE#1) registers its location according to the first embodiment of this invention.

The UE 7a of the first embodiment establishes a Point to Point Protocol (PPP) link or the like to the AGW 6a, and obtains the address of the P-CSCF 5a through DHCP or other protocols. Alternatively, the AGW 6a may notify the UE 7a of the address of the P-CSCF 5a at the time the PPP link is established.

The UE 7a located in the RAN N2a establishes a link to the AGW 6a (101). Upon establishment of the link, the UE 7a obtains a DHCP address and then the address of the P-CSCF 5a from a DHCP server. The UE 7a also obtains an IP address after the link to the AGW 6a is established. The UE 7a can obtain an IP address by, for example, receiving an IPv6 router advertisement from the AGW 6a.

In this embodiment, the UE 7a is not a mobile IP terminal and obtains an IP address "ue#1" in the RAN N2a. In the case where the UE 7a is a mobile IP-compatible terminal, the UE 7a uses the address obtained in the RAN N2a as a care-of address in mobile IP.

The UE 7a sends, in order to register the IP address used by the UE 7a in the IP network N 1, an SIP registration message (SIP REGISTER) to the P-CSCF 5a whose address has been obtained from the DHCP server (102).

The P-CSCF 5a identifies the I-CSCF 4a from the SIP URI of the UE 7 contained in the start-line of the received SIP registration message (REGISTER). The SIP registration message contains the public address (public user identity), authentication address (private user identity), and contact address of the UE 7a. The UE 7a in this embodiment has a public user identity "sip:user1_public1@home1.net" and a private user identity "UE#1". The address "ue#1" the UE 7a has obtained in the RAN N2a is set as the contact address.

The P-CSCF 5a sends the above SIP registration message (REGISTER) to the I-CSCF 4a (103).

The I-CSCF 4a sends, to the HSS 2, a subscriber information inquiry message (UAR: User Authorization Request) with the public address of the UE 7a that is contained in the SIP registration message received in Step 103 as a search key (104).

The HSS 2 searches the subscriber information using the public address of the UE 7a as a search key, and allocates the S-CSCF 3a to the UE 7a. The HSS 2 then sends, to the I-CSCF 4a, a response message (URR: User Authorization Response) containing the address information of the S-CSCF 3a (105).

The I-CSCF 4a sends the above-mentioned SIP registration message (REGISTER) to the S-CSCF 3a of which address information has been received in Step 105 (106).

Upon reception of the SIP location registration message (REGISTER), the S-CSCF 3a checks whether or not the UE 7a has been SIP-registered. The S-CSCF 3a checks this by searching the registration information table 200 with the public user identity ("UE#1" in the example of FIG. 6) that is contained in REGISTER (106) as a search key.

No corresponding entry (in the example of FIG. 6, entry that has "UE#1" as the public user identity 201) means that the UE 7a has not been registered yet. In this case, the S-CSCF 3a starts initial registration processing as location registration processing. The S-CSCF 3a then sends an inquiry (MAR: Multimedia Authentication Request) to the HSS 2 in order to obtain authentication information of the UE 7a to be registered (107). The address of the HSS 2 is set in the S-CSCF 3a prior to Step 107.

The HSS 2 searches for authentication information of the UE 7 using the public user identity and the private user identity as search keys that are contained in REGISTER (106), and sends the authentication information of the UE 7a to the S-CSCF 3a (MAA: Multimedia Authentication Response) (108). The HSS 2 stores the address of the S-CSCF 3a as an S-CSCF address that is allocated to the UE 7a.

Upon reception of the authentication information from the HSS 2, the S-CSCF 3a creates the new entry (200-1) in the information registration table 200, and stores the private user identity, the public user identity, and the authentication information received from the HSS 2 in the new entry 200-1 as shown in FIG. 4A.

The S-CSCF 3a then sends an SIP error response (401 Unauthorized) to the UE 7a via the I-CSCF 4a and the P-CSCF 5a (109, 110, 111). The error response contains information that is used for authentication calculation by the UE 7a.

The UE 7a carries out authentication calculation using the information that has been received in Step 111, and sends, to the P-CSCF 5a, an SIP registration message (REGISTER) that contains the private user identity, the public user identity, the contact address, and the result of the authentication calculation (112).

The P-CSCF 5a sends the SIP registration message received in Step 112 to the I-CSCF 4a (113).

The I-CSCF 4a sends, to the HSS 2, a subscriber information inquiry message (UAR: User Authorization Request) with the public address of the UE 7a that is contained in the SIP registration message received in Step 113 as a search key (114).

The HSS 2 searches the subscriber information using the public address of the UE 7a as a search key. Since the S-CSCF 3a has been registered in Step 107 as an S-CSCF address that the UE 7a uses, the HSS 2 sends a response message (URR: User Authorization Response) containing the address information of the S-CSCF 3a to the I-CSCF 4a (115).

The I-CSCF 4a sends the above-mentioned SIP registration message (REGISTER) to the S-CSCF 3a of which address information has been received in Step 115 (116).

The S-CSCF 3a checks whether or not the UE 7a has been SIP-registered. The S-CSCF 3a checks this by searching the registration information table 200 with the public user identity that is contained in REGISTER (116) as a search key. As a result of the search, the S-CSCF 3a detects the entry 200-1, which has been registered in Step 108, and reads authentication information out of the entry 200-1.

The S-CSCF 3a uses the authentication information read out of the entry 200-1 and the authentication calculation result received in Step 116 to perform authentication processing on the UE 7a. When the UE 7a is verified successfully, a contact header (ue#1) that is contained in SIP REGISTER received in Step 116 is stored in the field of the contact 203 in the entry 200-1 of the registration information table 200 (117).

The S-CSCF 3a inquires the HSS 2 about subscriber information of the UE 7a (SAR: Service Assignment Request) (118). The HSS 2 keeps subscriber information (service profile) for each private user identity which serves as a user authentication identifier. An identifier for communications (public user identity), core network service authorization, and initial filter criteria can be set in each service profile.

Initial filter criteria contain information showing the correlation between the AS 1 and a condition for activating the AS 1, a service point trigger. Information specific to each application, for example, information contained in an SIP request message (request-URI, SIP method, SIP header, SDP, etc.), is set in a service point trigger.

The HSS 2 reads initial filter criteria from the subscriber information (service profile) of the UE 7*a* with the private user identity as a search key, and sends the criteria to the S-CSCF 3*a* (SAA: Service Assignment Response) (119).

The S-CSCF 3*a* searches the registration information table 200 using the public user identity as a search key, and stores, in the found entry 200-1, the service profile received from the HSS 2 (120). The service profile is used when the S-CSCF 3*a* receives an SIP request message for the first time in order to determine whether to activate the application server.

The S-CSCF 3*a* sends an SIP registration normal response (200) to the UE 7*a* via the I-CSCF 4*a* and the P-CSCF 5*a* (121, 122, 123).

Upon reception of the response in Step 122, the P-CSCF 5*a* keeps for a given period of time the information on the address of the S-CSCF 3*a* which is allocated to the UE 7*a*.

The above-mentioned registration in the S-CSCF 3*a* is repeated at regular intervals, irrespective of whether the IP address of the UE 7*a* changes or not, in order to update the entry expiration date of SIP registration information managed by the S-CSCF 3*a*.

Described next is how the UE 7*a* activates a conference service.

Figure 7:
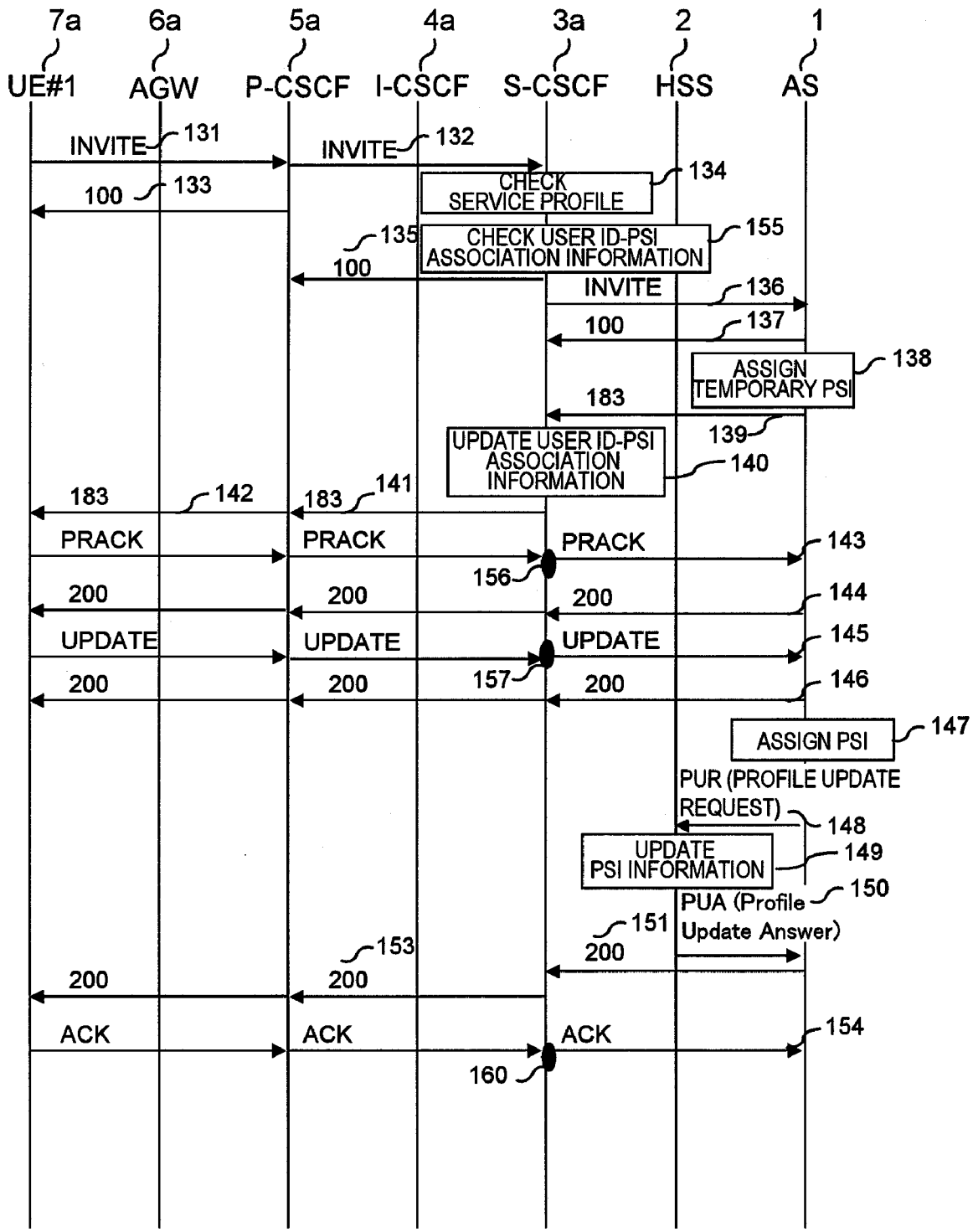
FIG. 7 is a sequence diagram showing a procedure through which the first UE activates a conference service according to the first embodiment of this invention.

FIG. 7 is a sequence diagram illustrating a procedure through which the UE 7*a* activates a conference service according to the first embodiment of this invention.

The UE 7*a* sends a session establishment request (IN-VITE) (131). The session establishment request is one of session control messages. The session establishment request message in this embodiment is a message for requesting the AS 1 to activate an application (activation of service conference is requested in this embodiment), and contains, as the request URI, the address of the AS 1 which provides the conference service (e.g., "conference_factory@as1.home1.net"). For instance, the public address (public user identity) of the UE 7*a*, "sip:user1_public1@home1.net", is contained as a P-Preferred-Identity header.

The session establishment request message (INVITE) is received by the P-CSCF 5*a*. Upon reception of the message, the P-CSCF 5*a* reads the address of the S-CSCF 3*a* which is allocated to the UE 7*a*, and sends the session establishment request message (INVITE) to the S-CSCF 3*a* (132). The P-CSCF 5*a* thereafter sends a temporary response (100 Trying) to this INVITE to the UE 7*a* (133).

Figure 12:
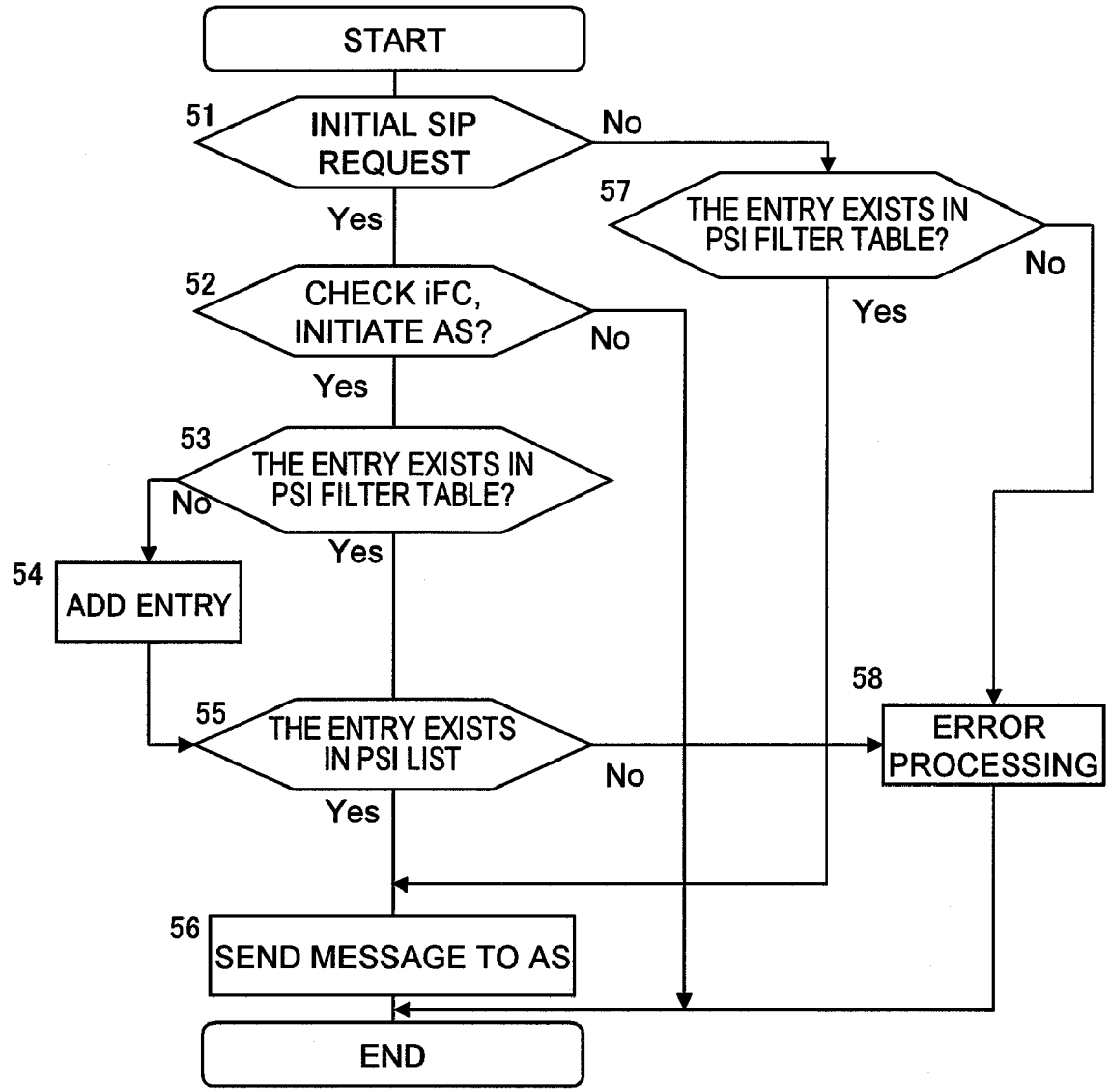
FIG. 12 is a flow chart illustrating the session end PSI filter reference processing routine of the first embodiment of this invention.

Upon reception of the session establishment request message (INVITE), the S-CSCF 3*a* sends a temporary response (100 Trying) to this INVITE to the P-CSCF 5*a*, and activates the PSI filter reference processing routine 50 shown in FIG. 12 (134).

FIG. 12 is a flow chart illustrating the PSI filter reference processing routine 50 according to the first embodiment of this invention.

As has been described with reference to FIG. 2, the PSI filter reference processing routine 50 is a sub-program of the program 37 which is stored in the memory 35 of the S-CSCF 3 and which is executed by the CPU 34. Accordingly, processing that is performed by the S-CSCF 3*a* in the description of FIG. 12 is actually executed by the CPU 34.

The S-CSCF 3*a* first checks whether or not the received SIP message is an initial SIP request other than REGISTER (51). An initial SIP request other than REGISTER means an SIP request for establishing a new SIP dialog or a single transaction SIP request.

When the received SIP message is an initial SIP request (in other words, when the answer is "Yes" in Step 51), the S-CSCF 3*a* searches the registration information table 200 using the public user identity as a search key to check whether a service provided by the AS 1 (conference service in this embodiment) should be activated or not (52). The S-CSCF 3*a* at this point refers to the service profile stored in Step 120 to confirm that the UE 7*a* is subscribing to the conference service. In a case where the UE 7*a* is a subscriber of the conference service, the UE 7*a* can receive the conference service. The S-CSCF 3*a* in this case judges in Step 52 that the conference service provided by the AS 1 should be activated (in other words, the routine proceeds to "Activated").

The S-CSCF 3*a* next searches the PSI filter information table 210 using the public user identity of the UE 7*a* as a search key (53).

When no corresponding entry is found in Step 53, the S-CSCF 3*a* creates the new entry 210-2 in the PSI filter information table 210, and stores the public user identity of the UE 7*a* (sip:user1_public1@home1.net) and the address set as the request URI (conference_factory@as1.home1.net) in the new entry 210-2 (54, 155).

An entry that is judged as a corresponding entry in Step 53 is one that has, as the public user identity 211, the public user identity of the UE 7*a* which is the sender of the received message, and that has, as the PSI 212, the address "conference_factory@as1.home1.net" which is set as the request URI of the received message. The same definition applies also to a "corresponding entry" in Step 57, which will be described later.

As a result of the new entry addition in Step 54, the correlation between a service provided by the AS 1 and a user who uses this service is registered in the PSI filter information table 210. From then on, when a user sends a message to the AS 1 whose service is associated with the user in the PSI filter information table 210, the message is judged as valid access and packets of the message are allowed to pass.

The S-CSCF 3*a* next refers to the PSI list 220 to identify the address of the AS 1 (55).

The S-CSCF 3*a* then sends SIP INVITE to the AS 1 (56, 136), and ends this routine.

When a corresponding entry is found in Step 53, the S-CSCF 3*a* skips Step 54 and executes Step 55.

In a case where the PSI filter reference processing routine 50 is activated in Step 134 of FIG. 7, the message received by the S-CSCF 3*a* is an initial SIP request. The answer is therefore "Yes" in Step 51 of FIG. 12 without exception. In a case where the PSI filter reference processing routine 50 is activated in other steps of FIG. 7 than Step 134 (for example, in Step 156, which will be described later), the message received by the S-CSCF 3*a* may not be an initial SIP request.

When it is judged in Step 51 that the received SIP message is not an initial SIP request, the S-CSCF 3*a* searches the PSI filter information table 210 using the public user identity of the UE 7*a* as a search key (57).

Specifically, the S-CSCF 3*a* judges in Step 57 whether or not the PSI filter information table 210 has a corresponding entry which matches information in the message received by the S-CSCF 3*a*.

When it is judged in Step 57 that the PSI filter information table 210 has a corresponding entry, the correlation between the public user identity of the UE 7*a*, which is the sender of the received message, and the request URI of the received message coincides with the correlation held in this entry. Then the message directed to the AS 1 and received by the S-CSCF 3*a* is deemed as valid access. The S-CSCF 3*a* accordingly identifies the address of the AS 1, and then sends the received message to the AS 1 (136, 56) before ending this routine 50. For example, in a case where the routine 50 is activated as a result of the reception of a session establishment request message (INVITE) by the S-CSCF 3a, this INVITE is send to the AS 1 in Step 56. The conference service is thus activated.

When it is judged in Step 57 that the PSI filter information table 210 does not have a corresponding entry, the message that the S-CSCF 3a has received is deemed as invalid access. For example, when the PSI filter information table 210 has only the entries 210-1 and 210-2 shown in FIG. 4B, and the S-CSCF 3a receives a message containing a public user identity "sip:user2_public1@home1.net" from the UE 7b, the S-CSCF 3a judges that the message received from the UE 7b is invalid access since this public user identity is not found in the PSI filter information table 210. The S-CSCF 3a executes error processing (58), and ends this routine.

When the PSI 221 of the conference service to be activated is not found in the PSI list 220 in Step 55, the S-CSCF 3a executes error processing (58) and ends this routine.

The next part of the description returns to FIG. 7.

The AS 1 receives the above-mentioned session establishment request message (INVITE) (136), sends a temporary response (100 Trying) to this INVITE to the S-CSCF 3a (137), and activates the application processing program. The AS 1 in this embodiment is an application server that provides a conference service.

While the application processing program for the conference service is being activated, the AS 1 judges that the UE 7a needs to be allocated a forum, and activates the PSI assign processing routine 60 (138). The AS 1 dynamically allocates a temporary PSI to the UE 7a by executing the PSI assign processing routine 60, and uses the allocated PSI in identifying a forum for the UE 7a.

Figure 15:
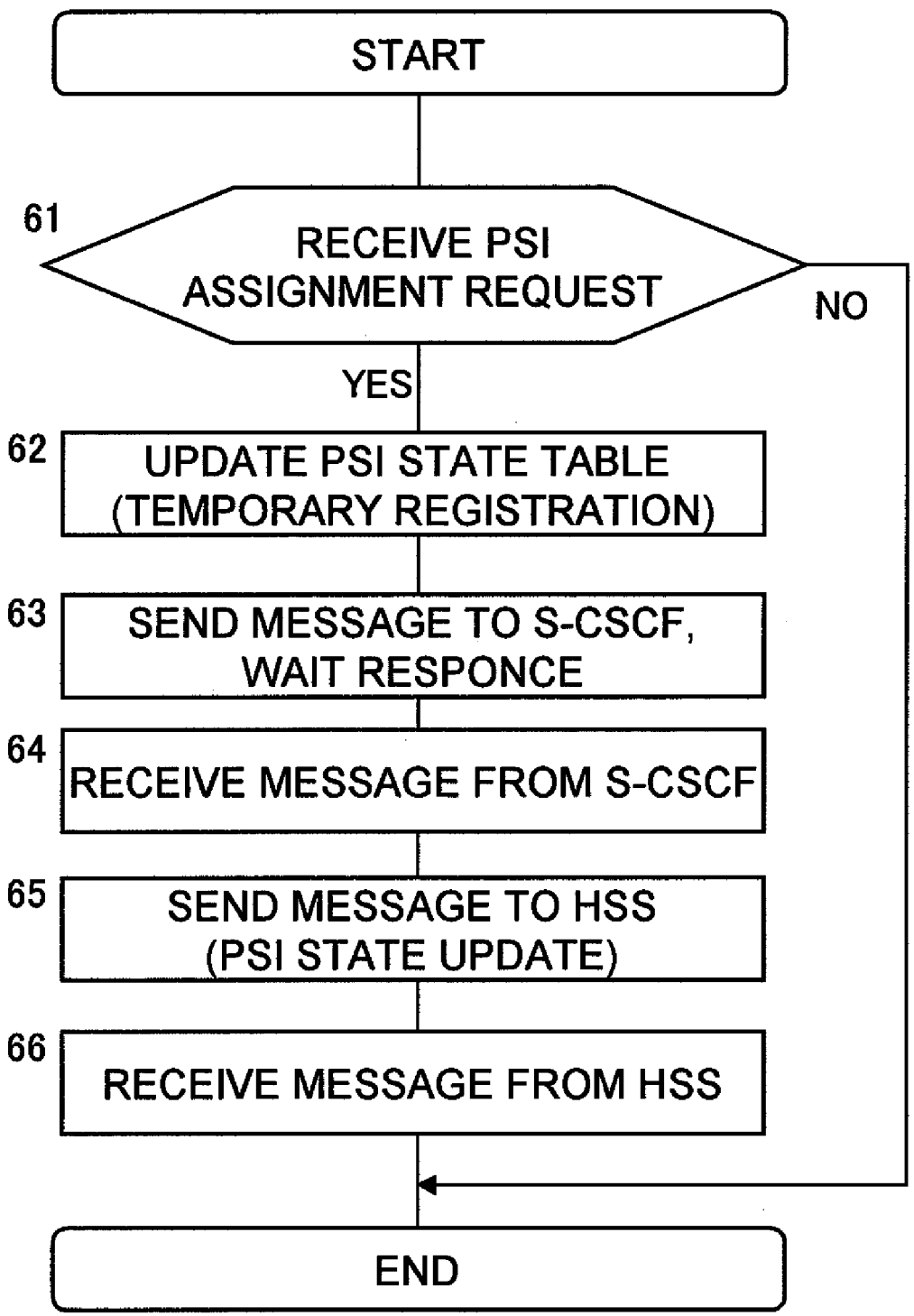
FIG. 15 is a flow chart illustrating the PSI assign processing routine according to the first embodiment of this invention.

FIG. 15 is a flow chart illustrating the PSI assign processing routine 60 according to the first embodiment of this invention.

As has been described with reference to FIG. 3, the PSI assign program 60 is a sub-program of the program 17 which is stored in the memory 15 of the AS 1 and which is executed by the CPU 14. Accordingly, processing performed by the AS 1 in the description of FIG. 15 is actually executed by the CPU 14.

The AS 1 receives a PSI assignment request (61), creates a PSI "conf1@as1.home1.net", and searches the PSI state table 240 using the created PSI "conf1@as1.home1.net" as a key.

When the PSI state table 240 does not have an entry that holds the created PSI, the AS 1 creates the new entry 240-1 to store the created PSI "conf1@as1.home1.net" as the PSI 241 and a state "temporarily allocated" as the state 242 in the new entry 240-1 (62).

The AS 1 then sends a temporary response 183 containing the above-mentioned PSI to the S-CSCF 3a (63, 139), and waits for a response from the S-CSCF 3a. The PSI "conf1@as1.home1.net" created by the AS 1 and an is focus parameter are set in the contact header of the temporary response 183.

The description returns again to FIG. 7.

The S-CSCF 3a receives from the AS 1 the temporary response 183 to SIP INVITE (139), and activates the PSI filter update processing routine 80.

Figure 13:
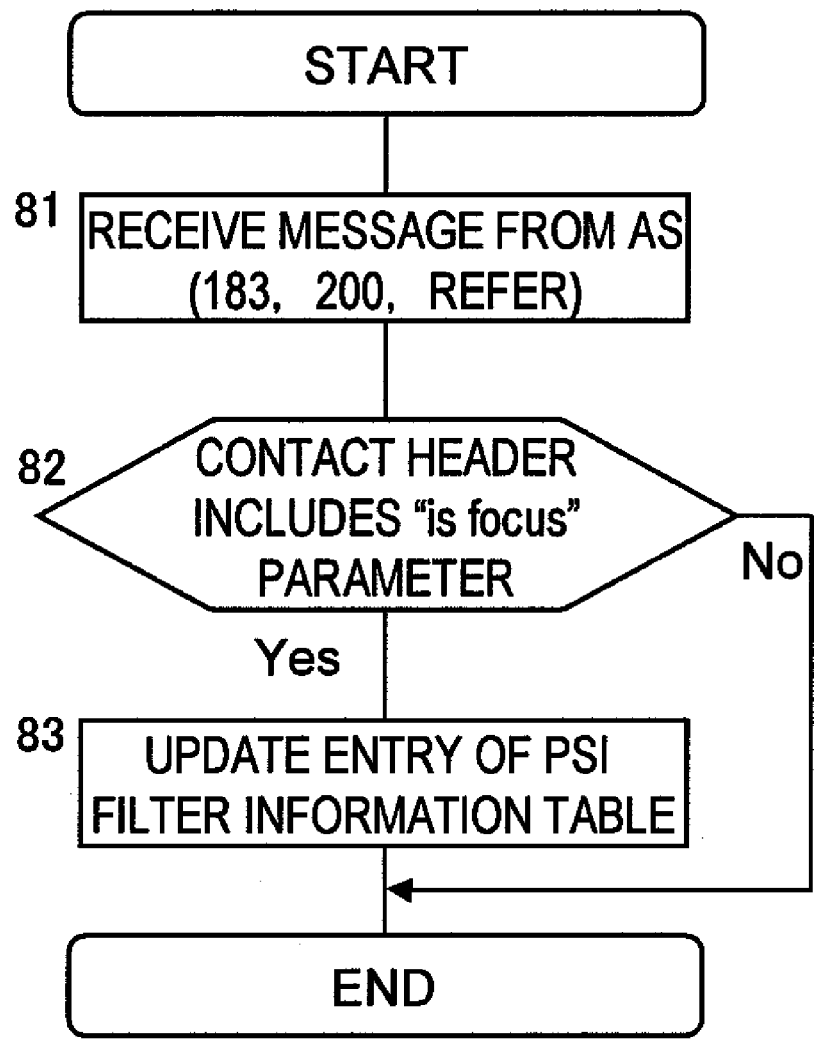
FIG. 13 is a flow chart illustrating the PSI filter update processing routine of the first embodiment of this invention.

FIG. 13 is a flow chart illustrating the PSI filter update processing routine 80 according to the first embodiment of this invention.

As has been described with reference to FIG. 2, the PSI filter update processing routine 80 is a sub-program of the program 37 which is stored in the memory 35 of the S-CSCF 3 and which is executed by the CPU 34. Accordingly, processing performed by the S-CSCF 3a in the description of FIG. 13 is actually executed by the CPU 34.

The S-CSCF 3a receives the temporary response 183 from the AS 1 (81), and judges whether or not the contact header of the received temporary response 183 contains an is focus parameter (82).

When the contact header contains the is focus parameter, the S-CSCF 3a extracts the PSI (conf1@as1.home1.net) from the contact header. The S-CSCF 3a extracts the public user identity of the UE 7a from the dialog ID of the SIP protocol, and searches the PSI filter information table 210 using the public user identity of the UE 7a as a search key.

When the PSI filter information table 210 does not have an entry that holds, as the public user identity 211, the public user identity of the UE 7a, which is the destination of the temporary response 183, and that holds, as the PSI 212, the PSI "conf1@as1.home1.net" extracted from the contact header, it means that the correlation between the identifier of a service that the UE 7a is about to receive and the identifier of the UE 7a is yet to be stored in the PSI filter information table 210. Then the S-CSCF 3a stores information about the correlation between the public user identity "sip: user1_public1@home1.net" of the UE 7a and the PSI "conf1@as1.home1.net" in a new entry (entry 210-1) (83, 140), and ends this routine.

In a case where the contact header of the temporary response 183 does not contain the is focus parameter in Step 82, the S-CSCF 3a ends this routine without updating the PSI filter information table 210.

Returning once more to FIG. 7, the description of the sequence is continued.

The S-CSCF 3a sends the temporary response 183 to INVITE to the UE 7a via the P-CSCF 5a (141, 142).

The UE 7a sends a provisional response acknowledgement (PRACK) in order to notify the AS 1 of the reception of the temporary response 183 of Step 142 (143).

The S-CSCF 3a receives PRACK and activates the PSI filter reference processing routine 50 (156). Since the PRACK message is not an initial SIP request, the S-CSCF 3a searches the PSI filter information table 210 using the public user identity of the UE 7a as a key (57). Through the search, the S-CSCF 3a finds as a corresponding entry the entry 210-2 updated in Step 155, and sends the received PRACK message to the AS 1.

When no corresponding entry is found in the PSI filter information table 210 in Step 57, the S-CSCF 3a executes error processing (58), and terminates this routine 50. Having the PSI filter information table 210 and the PSI filter reference program 50, the S-CSCF 3a is capable of executing filtering with the use of PSI.

The AS 1 sends, to the UE 7a, a response message (200 OK) indicating that PRACK has been received normally (144).

The S-CSCF 3a receives the response message (200 OK) of Step 144 and activates the PSI filter update processing routine 80. However, the is focus parameter is not contained in this case (81, 82). The S-CSCF 3a therefore terminates this routine 80 without updating the PSI filter information table 210.

Subsequently, the UE 7a sends an UPDATE message to the AS 1 in order to notify the AS 1 of the completion of resource reservation (145).

The S-CSCF 3a receives the UPDATE message of Step 145, and activates the PSI filter reference processing routine 50 as in Step 156 (157). Since the UPDATE message is not an initial SIP request, the S-CSCF 3a searches the PSI filter information table 210 using the public user identity of the UE 7a as a key (57). Through the search, the S-CSCF 3a finds as a corresponding entry the entry 210-2 updated in Step 155, and sends the received UPDATE message to the AS 1.

When no corresponding entry is found in the PSI filter information table 210 in Step 57, the S-CSCF 3a executes error processing (58), and terminates this routine 50.

Upon reception of the UPDATE message of Step 145, the AS 1 sends, to the UE 7a, via the S-CSCF 3a and the P-CSCF 5a, a response message (200 OK) indicating that UPDATE has been received normally (146).

The S-CSCF 3a receives the response message (200 OK) of Step 146 and activates the PSI filter update processing routine 80. However, the is focus parameter is not contained in this case (81, 82). The S-CSCF 3a therefore terminates this routine 80 without updating the PSI filter information table 210.

The reception of the UPDATE message of Step 145 causes the AS 1 to officially allocate the PSI that has been allocated temporarily in Step 138, and to update the value "Temporarily Allocated" of the state 242 in the corresponding entry of the PSI state table 240 with a value "Active" (147). Furthermore, the AS 1 searches the subscriber list 250 with the PSI "conf1@as1.home1.net" allocated in Step 138 by the AS 1 as a search key. When an entry having the PSI "conf1@as1.home1.net" is found in the subscriber list 250, the AS 1 adds the public user identity of the UE 7a to the field of the public user identity 252 in the found entry.

When an entry having the PSI "conf1@as1.home1.net" is not found in the subscriber list 250, the AS 1 adds a new entry (entry 250-1), and stores information about the correlation between the PSI "conf1@as1.home1.net" and the public user identity of the UE 7a in the new entry (147).

The AS 1 sends, to the HSS 2, a notification (PUR: Profile Update Request) that contains the information about the correlation between the PSI allocated in Step 147 and the public user identity of the UE 7a (148). Upon reception of the notification of Step 148, the HSS 2 stores the correlation information contained in the notification and sends a response message to PUR (PUA: Profile Update Response) to the S-CSCF 3a (149, 150).

The AS 1 sends, to the UE 7a, via the S-CSCF 3a and the P-CSCF 5a, a final response (200 OK) to INVITE received in Step 136 (151, 153).

The S-CSCF 3a receives the response message (200 OK) of Step 151 and activates the PSI filter update processing routine 80. However, the is focus parameter is not contained in the received response in this case (81, 82). The S-CSCF 3a therefore terminates this routine 80 without updating the PSI filter information table 210.

The UE 7a receives the normal response message of Step 153 and sends an acknowledgment message (ACK) to the AS 1 via the P-CSCF 5a and the S-CSCF 3a (154).

The S-CSCF 3a receives the ACK message of Step 154, and activates the PSI filter reference processing routine 50 as in Step 156 (160). Since the ACK message is not an initial SIP request (51), the S-CSCF 3a searches the PSI filter information table 210 using the public user identity of the UE 7a as a key (57). Through the search, the S-CSCF 3a finds as a corresponding entry the entry 210-2 updated in Step 155, and sends the received ACK message to the AS 1.

When an entry that has the public user identity of the UE 7a is not found in the PSI filter information table 210 in Step 57, the S-CSCF 3a executes error processing (58), and terminates this routine 50.

The UE 7a follows the above-mentioned sequence in activating a conference service execution of which is controlled by the AS 1. Running the sequence gives the S-CSCF 3a a mechanism of allowing or prohibiting the passage of a message that is destined to the address of a forum to which the UE 7a subscribes. An invalid message is thus prevented from being forwarded to the AS 1.

Described next is how the UE 7a calls the UE 7b to a forum.

Figure 8:
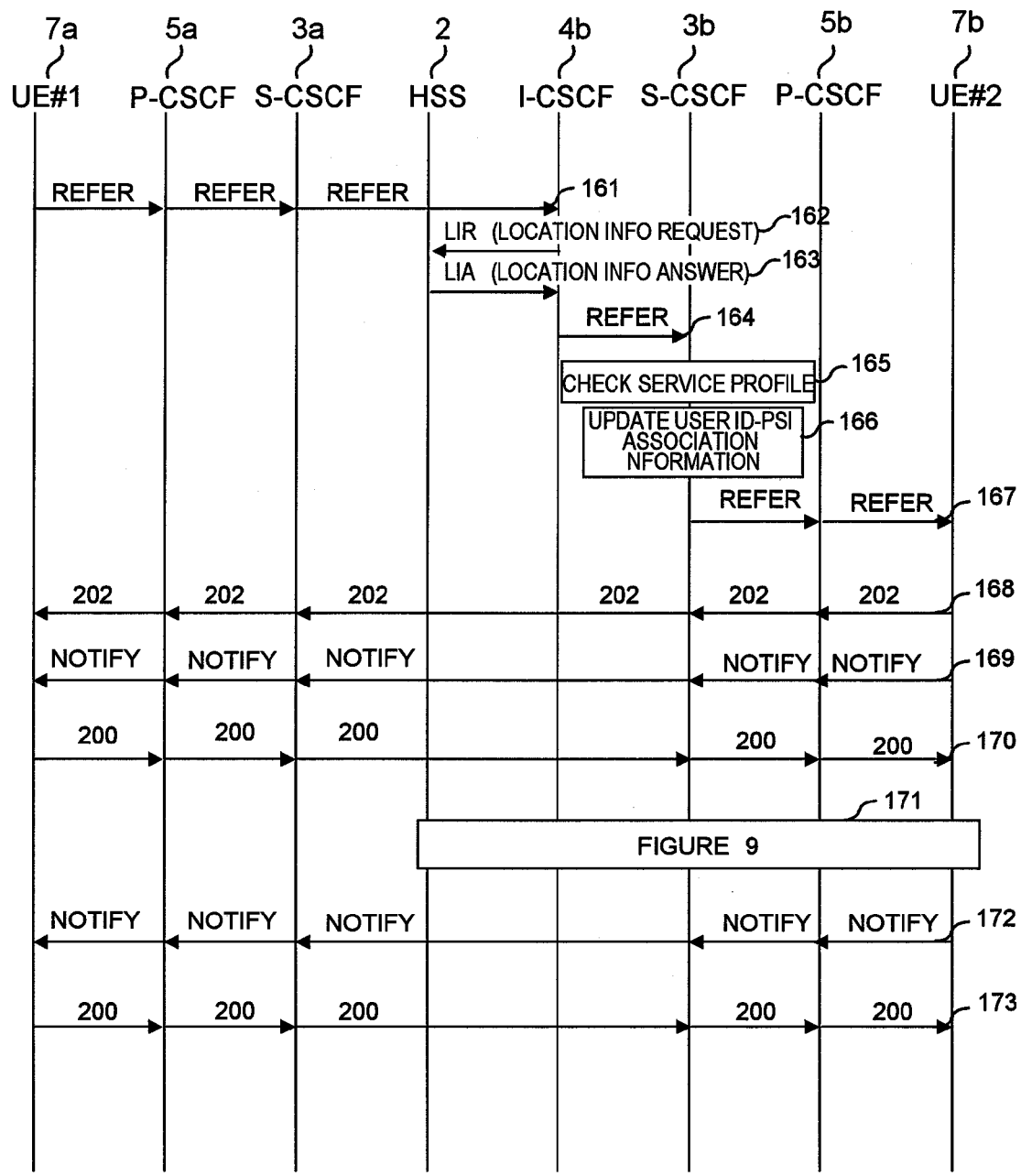
FIG. 8 is a sequence diagram showing a procedure through which the first UE calls a second UE to a forum according to the first embodiment of this invention.

FIG. 8 is a sequence diagram illustrating a procedure through which the UE 7a calls the UE 7b to a forum according to the first embodiment of this invention.

The premise here is that the UE 7b has been registered in the S-CSCF 3b through the same procedure as the registration procedure of the UE 7a shown in FIG. 6.

The UE 7a sends a REFER message to the S-CSCF 3a via the P-CSCF 5a in order to call the UE 7b to a conference service. The REFER message has a request URI header in which the public user identity of the UE 7b, "sip: user2_public1@home1.net" is set. The REFER message also has a refer-to header containing the identifier of a forum to which the UE 7a is calling the UE 7b, "conf1@as1.home1.com".

The S-CSCF 3a identifies, from the request URI of the REFER message, the I-CSCF 4b located in the network to which the UE 7b has signed up (home network), and sends the REFER message to the identified I-CSCF 4b (161).

The I-CSCF 4b sends a location information inquiry message (LIR: Location Information Request) to the HSS 2 with the public address of the UE 7b that is contained in the SIP REFER message received in Step 161 as a search key (162).

The HSS 2 searches the subscriber information using the public address of the UE 7b as a search key, and detects the address of the S-CSCF 3b which is allocated to the UE 7b. The HSS 2 then sends a response message (LIA: Location Information Answer) containing the address information of the S-CSCF 3b to the I-CSCF 4b (163).

The I-CSCF 4b sends the SIP REFER message to the S-CSCF 3b whose address information is contained in the LIA message (164).

Upon reception of the REFER message of Step 164, the S-CSCF 3b activates the PSI filter reference processing routine 50 (165). Since the REFER message is an initial SIP request (51), the S-CSCF 3b judges whether to activate the application server 1 by referring to the subscriber information (service profile) that has been downloaded from the HSS 2 upon registration (52).

The S-CSCF 3b here judges that the UE 7b is subscribing to the conference service, and stores an entry for the UE 7b in the PSI filter information table 210 that is kept in the S-CSCF 3b (166). The entry for the UE 7b stored here holds information indicating the correlation between the public address (public user identity) of the UE 7b and the PSI "conf1@as1.home1.net" as a forum identifier set in the refer-to header.

The S-CSCF 3b thereafter sends the SIP REFER message to the UE 7b via the P-CSCF 5b (167).

The UE 7b sends a normal response (response code: 202) to this SIP request to the UE 7a via the P-CSCF 5b, the S-CSCF 3b, the I-CSCF 4b, the S-CSCF 3a, and the P-CSCF 5a (168).

The UE 7b receives a response code and sends an SIP NOTIFY message to the UE 7a in order to notify the UE 7a of an event state received through the REFER message of Step 167 (169).

Upon reception of the SIP NOTIFY message, the UE 7a sends a normal response (200) to the NOTIFY message to the UE 7b (170).

In a case where the UE 7b intends to join the form to which the UE 7b is called through the SIP REFER message of Step 167, the UE 7b executes a sequence that is described later with reference to FIG. 9 (171).

Figure 9:
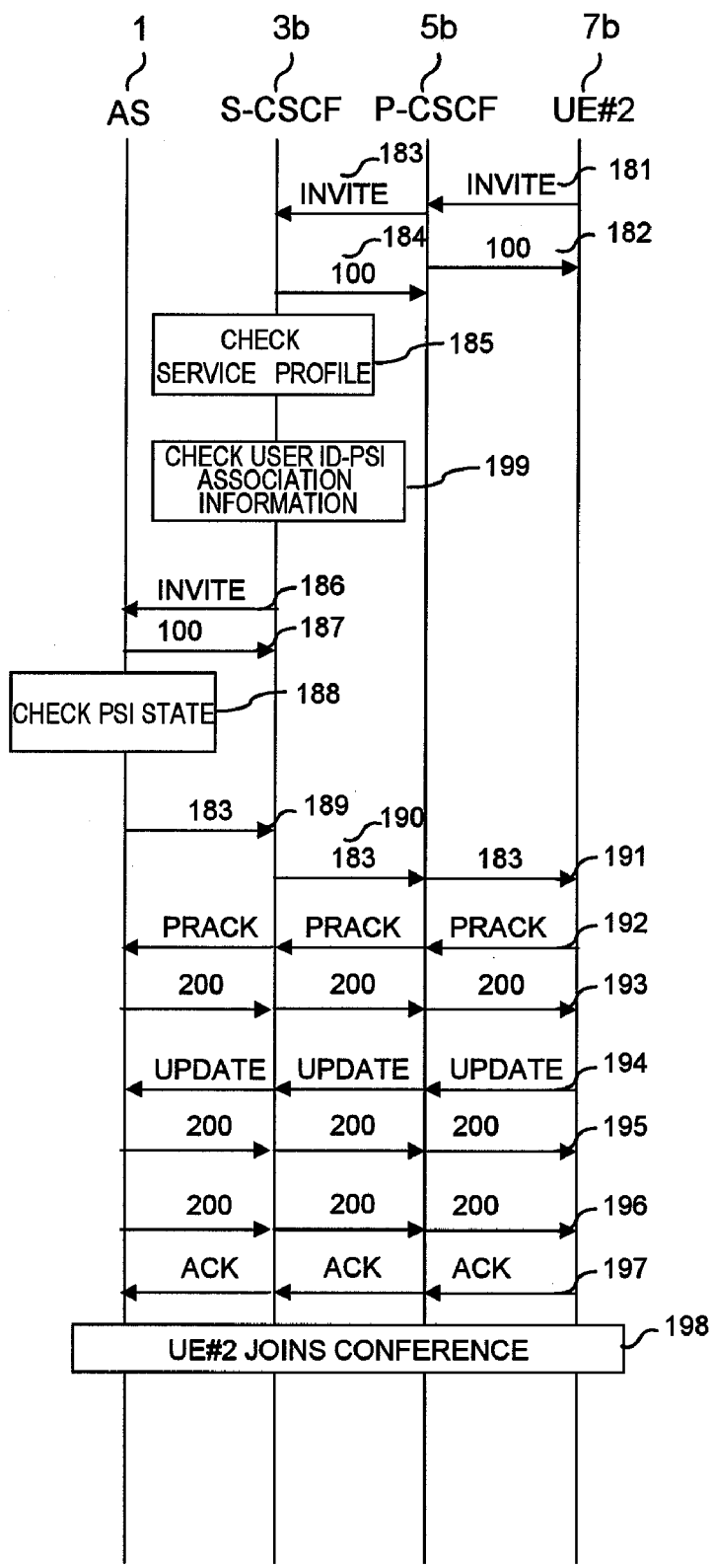
FIG. 9 is a sequence diagram illustrating a procedure that is employed by the second UE to join a forum to which the second UE is called by the first UE according to the first embodiment of this invention.

After finishing the forum joining processing of FIG. 9, the UE 7b sends an SIP NOTIFY message to the UE 7a to notify the UE 7a of the completion of the forum joining processing (172). Upon reception of the SIP NOTIFY message without a trouble, the UE 7a sends a response code 200 to the UE 7b (173).

From then on, the S-CSCF 3a and the S-CSCF 3b activate their respective PSI filter reference processing routines 50 upon receiving an SIP request message. The S-CSCF 3a and the S-CSCF 3b judge whether or not the correlation between the identifier of the UE 7 that is the sender of the SIP request message and the identifier of the AS 1 to which the message is directed (or identifier of a service the sender UE 7 is receiving) matches correlation that is indicated by information held in the PSI filter information table 210 (57). The S-CSCF 3a and the S-CSCF 3b send the SIP request message to the AS 1 only when the former correlation and the latter correlation coincide with each other (56). A discrepancy between the former and the latter means that the received SIP request message is invalid. Then the S-CSCF 3a and the S-CSCF 3b executes error processing instead of sending the SIP request message to the AS 1 (58).

Described next is how the UE 7b joins a forum to which the UE 7b is called by the UE 7a.

FIG. 9 is a sequence diagram illustrating a procedure that is employed by the UE 7b to join a forum to which the UE 7b is called by the UE 7a according to the first embodiment of this invention.

The UE 7b sends a session establishment request message (INVITE) in which the forum's PSI received in Step 167 (for example, "conference_factory@as1.home1.net") is set as a request URI (181). This SIP INVITE has a p-preferred-identity header containing the public address (public user identity) of the UE 7b, for example.

The P-CSCF 5b receives the session establishment request message (INVITE), reads the address of the S-CSCF 3b which is allocated to the UE 7b, and sends the session establishment request message (INVITE) to the S-CSCF 3b (183). Thereafter, the P-CSCF 5b sends a temporary response (100 Trying) to this INVITE to the UE 7b (182).

Upon reception of the session establishment request message (INVITE), the S-CSCF 3b sends a temporary response (100 Trying) to this INVITE to the P-CSCF 5b, and activates the PSI filter reference processing routine 50 shown in FIG. 12 (184). Some steps of the following procedure have already been described, and therefore will not be depicted in detail here.

First, the S-CSCF 3b checks whether or not the received SIP message is an initial SIP request other than REGISTER (51). An initial SIP request other than REGISTER means an SIP request for establishing a new SIP dialog or a single transaction SIP request.

When the received SIP message is an initial SIP request, the S-CSCF 3b searches the registration information table 200 using the public user identity as a search key to check whether the AS 1 should be activated or not (52). The S-CSCF 3b at this point refers to the service profile that the S-CSCF 3b has obtained from the HSS 2 upon registration of the UE 7b (185), to thereby confirm that the UE 7b is subscribing to the conference service.

The S-CSCF 3b next searches the PSI filter information table 210 using the public user identity as a search key (53). The S-CSCF 3b finds as a result of the search the entry updated in Step 166 (199).

Thereafter, the S-CSCF 3b refers to the PSI list 220 to identify the address of the AS 1 (56), sends SIP INVITE to the AS 1 (186), and ends this routine 50.

The AS 1 receives the above-mentioned session establishment request message (INVITE) (186), sends a temporary response (100 Trying) to this INVITE to the S-CSCF 3b (187), and activates the application processing program. The AS 1 in this embodiment is an application server that provides a conference service.

While the application processing program for the conference service is being activated, the AS 1 searches the PSI state table 240 using as a search key the PSI "conf1@as1.home1.net" which is set as the request URI of the received INVITE. The AS 1 finds as a result of the search the entry 240-1, and checks the state 242 of this PSI (188). It is judged that the PSI has been allocated by the AS 1 when the state 242 of the PSI is "Active".

The AS 1 next searches the subscriber list 250 with the PSI "conf1@as1.home1.net" as a search key. The AS 1 detects the entry 250-1 created in Step 147, and adds the public user identity "sip:user2_public1@home1.net" of the UE 7b to the field of the public user identity 252 in the entry 250-1.

The AS 1 then sends the temporary response 183 that contains the above PSI to the S-CSCF 3b (189), and waits for a response from the S-CSCF 3b.

Upon reception of the temporary response 183 to SIP INVITE from the AS 1 (189), the S-CSCF 3b activates the PSI filter update processing routine 80 (811).

In a case where the contact header of the temporary response 183 does not contain the is focus parameter in Step 82, the S-CSCF 3a ends this routine 80 without updating the PSI filter information table 210.

The S-CSCF 3a sends the temporary response 183 to INVITE to the UE 7b via the P-CSCF 5b (190, 191).

The UE 7b sends a PRACK in order to notify the AS 1 of the reception of the temporary response of Step 191 (192).

The S-CSCF 3b receives PRACK and activates the PSI filter reference processing routine 50. Since the PRACK message is not an initial SIP request (51), the S-CSCF 3b searches the PSI filter information table 210 using the public user identity of the UE 7b as a key (57). Through the search, the S-CSCF 3b finds the entry updated in Step 166, and sends the received PRACK message to the AS 1.

When no corresponding entry is found in the PSI filter information table 210 in Step 57, the S-CSCF 3b executes error processing (58), and terminates this routine 50.

The S-CSCF 3b can perform filtering with the use of PSI by holding the PSI filter information table 210 and executing the PSI filter reference processing routine 50 as described above. In other words, the S-CSCF 3b can base, on PSI, the judgment of whether to allow or prohibit the passage of a message destined to the address of a forum to which the UE 7b subscribes.

The AS 1 sends, to the UE 7b, a response message (200 OK) indicating that PRACK has been received normally (193). The S-CSCF 3b receives the response message (200 OK) and activates the PSI filter update processing routine 80. However, the is focus parameter is not contained in the received message in this case (81, 82). The S-CSCF 3b therefore terminates this routine 80 without updating the PSI filter information table 210.

Subsequently, the UE 7b sends an UPDATE message to the AS 1 in order to notify the AS 1 of the completion of resource reservation (194).

Upon reception of the UPDATE message of Step 194, the S-CSCF 3b activates the PSI filter reference processing routine 50 and searches the PSI filter information table 210 using the public user identity of the UE 7b as a key (57). The S-CSCF 3b finds as a result of the search the entry updated in Step 166, and sends the received UPDATE message to the AS 1.

In a case where an entry having the public user identity of the UE 7b is not found in the PSI filter information table 210, the S-CSCF 3b executes error processing (58), and terminates this routine 50.

Upon reception of the UPDATE message of Step 194, the AS 1 sends, to the UE 7b, via the S-CSCF 3b and the P-CSCF 5b, a response message (200 OK) indicating that UPDATE has been received normally (195).

The S-CSCF 3b receives the response message (200 OK) and activates the PSI filter update processing routine 80. However, the is focus parameter is not contained in the received message in this case (81, 82). The S-CSCF 3b therefore terminates this routine 80 without updating the PSI filter information table 210.

The AS 1 then sends, to the UE 7b, via the S-CSCF 3b and the P-CSCF 5b, a final response (200 OK) to INVITE received in Step 186 (196).

The UE 7b receives the normal response message of Step 196 and sends an acknowledgment message (ACK) to the AS 1 via the P-CSCF 5b and the S-CSCF 3b (197).

Through the above-mentioned processing, the UE 7b can join the forum "conf1.@as1.home1.net" to which the UE 7b is called by the UE 7a.

Described next is how the UE 7b exits from a forum to which the UE 7b is called by the UE 7a.

Figure 10:
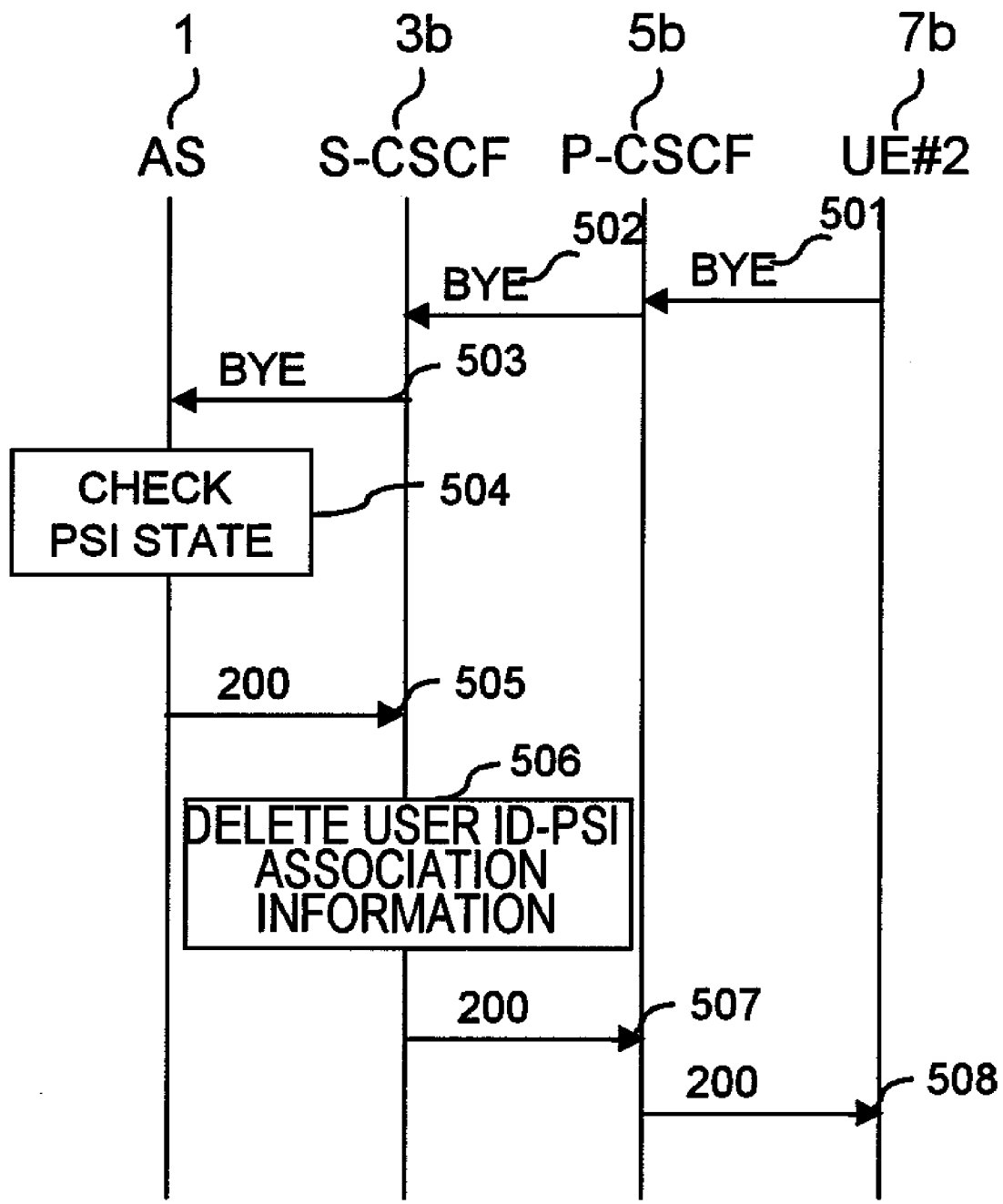
FIG. 10 is a sequence diagram illustrating a procedure that is employed by the second UE to exit a forum to which the second UE is called by the first UE according to the first embodiment of this invention.

FIG. 10 is a sequence diagram illustrating a procedure that is employed by the UE 7b to exit a forum to which the UE 7b is called by the UE 7a according to the first embodiment of this invention.

The UE 7b sends a release request (BYE) message to the AS 1 via the P-CSCF 5b and the S-CSCF 3b (501, 502, 503). Set as the request URI of the release request (BYE) is the application identifier PSI "conf1@as1.home1.net" indicating the forum to which the UE 7b has been called by the UE 7a (will be referred to as "the forum the UE 7b is about to exit" in the following description).

The S-CSCF 3b receives the release request (BYE) (502) and activates the PSI filter update processing routine (session termination) 90.

Figure 14:
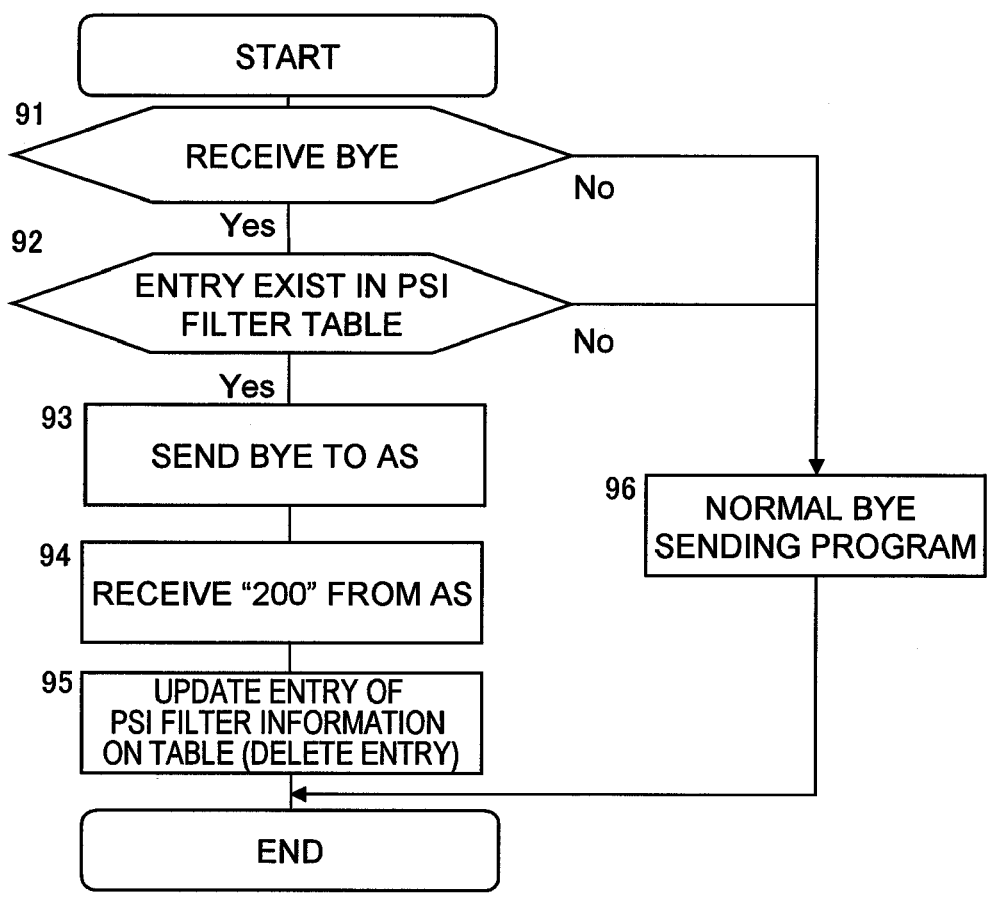
FIG. 14 is a flow chart illustrating the session end PSI filter update processing routine of the first embodiment of this invention.

FIG. 14 is a flow chart illustrating the PSI filter update processing routine (session termination) 90 according to the first embodiment of this invention.

As has been described with reference to FIG. 2, the PSI filter update processing routine (session termination) 90 is a sub-program of the program 37 which is stored in the memory 35 of the S-CSCF 3 and which is executed by the CPU 34. Accordingly, processing that is performed by the S-CSCF 3b in the description of FIG. 14 is actually executed by the CPU 34.

The S-CSCF 3b receives a release request (BYE) (91), and searches the PSI filter information table 210 using as a search key the PSI "conf1@as1.home1.net", which indicates the forum that the UE 7b is about to exit (92). The S-CSCF 3b finds as a result of the search the entry created in Step 190.

In a case where an entry that meets the search criterion is found in Step 92, the S-CSCF 3b sends the release request (BYE) to the AS 1 and waits for a response from the AS 1 (93).

In a case where the PSI filter information table 210 has no entry that meets the search criterion in Step 92, the S-CSCF 3b executes normal BYE transmission processing (96).

Returning to FIG. 10, the AS 1 receives the release request (BYE) of Step 503, and searches the subscriber list 250 using as a search key the PSI "conf1@as1.home1.net", which indicates the forum that the UE 7b is about to exit (92). The S-CSCF 3b finds as a result of the search the entry 250-1 updated in Step 188, and deletes information of the UE 7b from the field of the public user identity 252 in the found entry (504).

The AS 1 thereafter sends normal response (200 OK) to the UE 7b to notify the UE 7b that processing of the release request (BYE) is completed normally (505).

The S-CSCF 3b receives the normal response of Step 505, and resumes the PSI filter update processing routine (session termination) 90 (94). Returning to FIG. 14, the S-CSCF 3b deletes the public user identity of the UE 7b from the entry found in Step 92 (506, 95), and end this routine 90.

When a user who uses a PSI stops subscribing to an application, the S-CSCF 3 can update PSI-user correlation information by executing the PSI filter update processing routine (session termination) 90. The S-CSCF 3 thereafter judges whether to allow or prohibit the passage of a message based on the updated correlation information. If a user sends a message about an application to which the user is no longer subscribing to the S-CSCF 3, the message is prohibited from passing the S-CSCF 3.

Described next is how to close a forum as soon as the UE 7a exits the forum.

Figure 11:
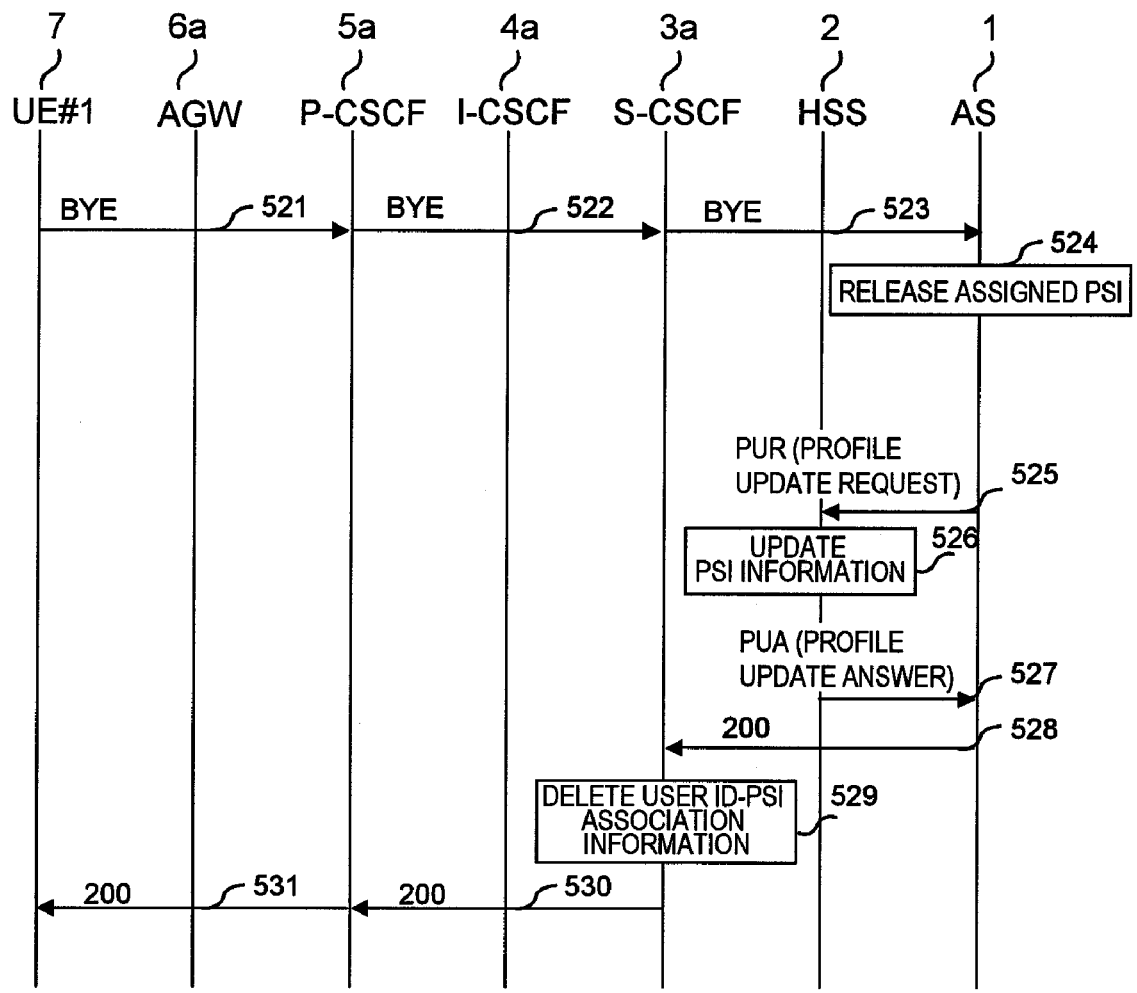
FIG. 11 is a sequence diagram illustrating the procedure of closing a forum as soon as the first UE exits the forum according to the first embodiment of this invention.

FIG. 11 is a sequence diagram illustrating the procedure of closing a forum as soon as the UE 7a exits the forum according to the first embodiment of this invention.

The UE 7a sends a release request (BYE) to the AS 1 via the P-CSCF 5a and the S-CSCF 3a (521, 522, 523). Set as the request URI of the release request (BYE) is the application identifier PSI "conf1@as1.home1.net", which indicates the forum that the UE 7a has received from the AS 1 (will be referred to as "the forum that the UE 7a is about to exit" in the following description).

The S-CSCF 3a receives the release request (BYE) (522) and activates the PSI filter update processing routine (session termination) 90 (91).

The S-CSCF 3a searches the PSI filter information table 210 using as a search key the PSI "conf1@as1.home1.net", which indicates the forum that the UE 7a is about to exit (92). The S-CSCF 3a finds as a result of the search the entry 210-1 created in Step 155.

In a case where an entry that meets the search criterion is found in Step 92, the S-CSCF 3a sends the release request (BYE) to the AS 1 and waits for a response from the AS 1 (93).

In a case where the PSI filter information table 210 has no entry that meets the search criterion in Step 92, the S-CSCF 3a executes normal BYE transmission processing (96).

Upon reception of the release request (BYE) of Step 523, the AS 1 searches the subscriber list 250 using as a search key the PSI "conf1@as1.home1.net", which indicates the forum that the UE 7a is about to exit. The S-CSCF 3a finds through the search the entry 250-1 updated in Step 147, and deletes information of the UE 7a from the field of the public user identity 252 in the found entry. As a result of the deletion, no public user identity remains that uses the PSI of the entry 250-1. The AS 1 therefore deletes the entry 250-1 from the table 250.

After deleting the entry from the table 250, the AS 1 activates the PSI release processing routine 70 and requests for release assigned PSI (524).

Figure 16:
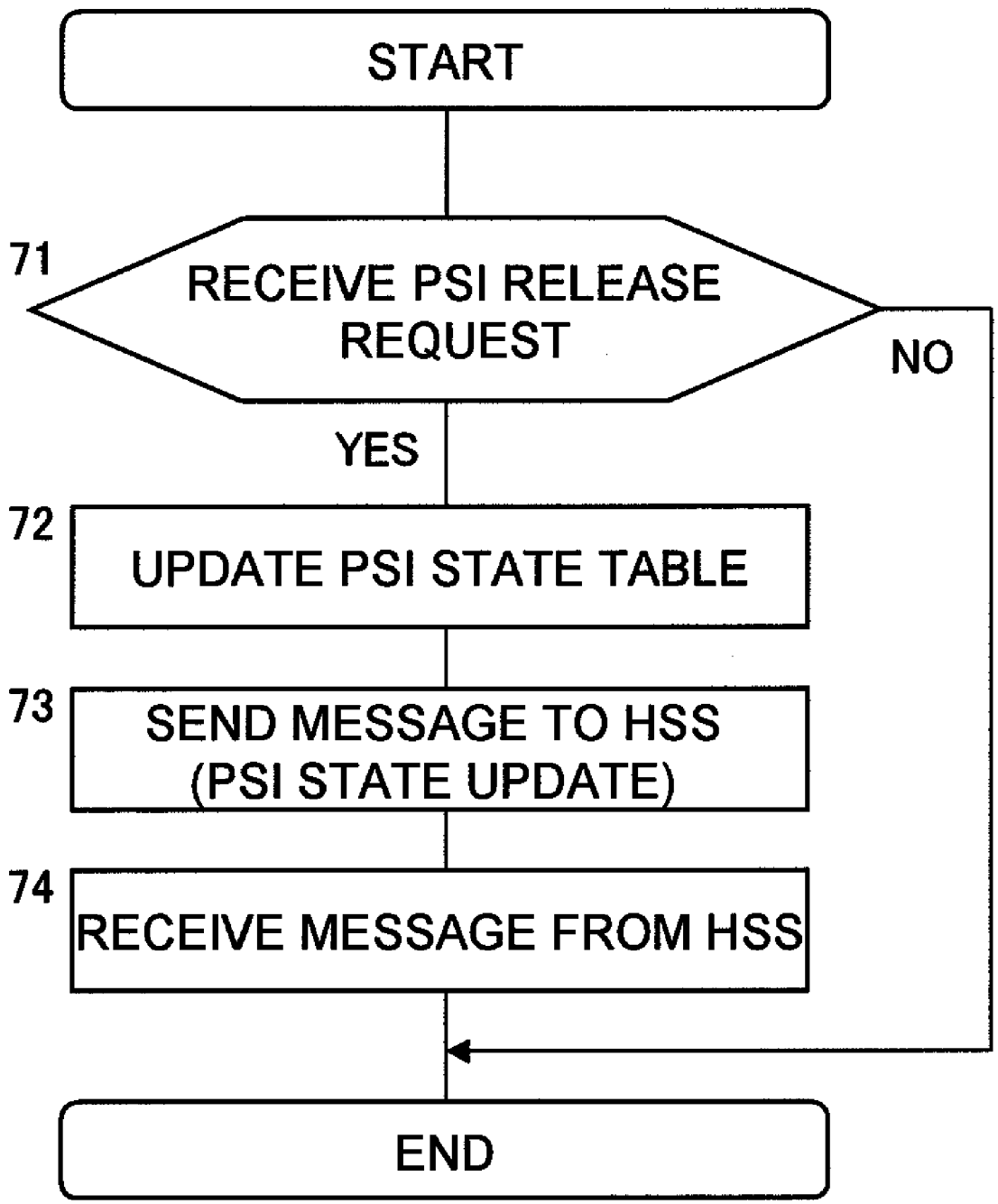
FIG. 16 is a flow chart illustrating the PSI release processing routine according to the first embodiment of this invention.

FIG. 16 is a flow chart illustrating the PSI release processing routine 70 according to the first embodiment of this invention.

As has been described with reference to FIG. 3, the PSI release program 70 is a sub-program of the program 17 which is stored in the memory 15 of the AS 1 and which is executed by the CPU 14. Accordingly, processing performed by the AS 1 in the description of FIG. 16 is actually executed by the CPU 14.

The AS 1 receives a PSI release request (71) and searches the PSI state table 240 using as a search key a PSI to be removed. The AS 1 finds as a result of the search the entry 240-1 having a PSI that has been temporarily allocated in Step 138 and officially allocated in Step 147, and deletes the entry 240-1 (72).

The AS 1 requests the HSS 2 to update PSI information that is managed by the HSS 2 (PUR: Profile Update Request) (73, 525).

The HSS 2 deactivates the PSI that has been activated in the update of Step 149 (526), and sends a response (PUA: Profile Update Answer) to the AS 1 (527).

Upon reception of the PUA of Step 527 from the HSS 2 (528), the AS 1 ends the PSI release processing routine 70.

Returning to FIG. 11, the description of the sequence is continued.

The AS 1 thereafter sends a normal response (200 OK) to the UE 7a to notify the UE 7a that the processing of the release request (BYE) has been completed normally (528, 530, 531).

Upon reception of the normal response of Step 528, the S-CSCF 3a resumes the session end PSI filter update processing routine 90 (94). The S-CSCF 3a deletes the public user identity of the UE 7a from the entry found in Step 92 (95, 529), and end this routine 90.

Having the session end PSI filter update program 90, the AS 1 is capable of updating PSI-user correlation information when a user who uses a PSI stops subscribing to an application.

The S-CSCF 3a can perform dynamic, PSI-based access control by executing the session end PSI filter update processing routine 90. In other words, the S-CSCF 3a can prevent invalid access to the AS 1 by executing the session end PSI filter update processing routine 90.

The S-CSCF 3 and the HSS 2 in this embodiment may be implemented by the same communication device. Alternatively, the S-CSCF 3 and the AS 1 in this embodiment may be implemented by the same device. It is even possible in this embodiment to implement the S-CSCF 3, the AS 1, and the HSS 2 with one device. Also, the S-CSCF 3, the I-CSCF 4, and the P-CSCF 5 in this embodiment may be implemented by the same device.

As has been described, according to the first embodiment of this invention, the S-CSCF 3 associates an application identifier and the public address of a user (UE 7) when the UE 7 starts subscribing to an application for the first time, and keeps the information as the PSI filter information table 210. The S-CSCF 3 dissociates the application identifier and the user's public address when the UE 7 stops subscribing to the application. The S-CSCF 3 can use, as packet filtering information, the identifier of the application to which the UE 7 subscribes.

Specifically, the S-CSCF 3 executes the PSI filter reference processing routine 50 shown in FIG. 12 when a packet that contains a message directed to the AS 1 is received from the UE 7 or other terminals (for example, in Steps 134, 155, 156, 157, and 160 of FIG. 7 and Steps 192 and 194 of FIG. 9). In the case where the received message is not an initial SIP request, the S-CSCF 3 judges whether or not a corresponding entry is found in the PSI filter information table 210 (57).

When a corresponding entry is found in Step 57, forwarding the received message to the AS 1 does not constitute invalid access. The S-CSCF 3 therefore allows the received packet containing the message a passage, and sends the packet to the AS 1 (56).

When no corresponding entry is found in Step 57, on the other hand, forwarding the received message to the AS 1 constitutes invalid access. The S-CSCF 3 therefore denies the received packet containing the message a passage, and executes error processing (58).

Invalid access to the AS 1 is thus prevented through packet filtering that is performed by the S-CSCF 3 using application identifiers.

A second embodiment of this invention will now be described with reference to the drawings.

In the second embodiment described above, invalid access to the AS 1 is prevented by the S-CSCF 3 judging whether to grant a received packet a passage. The S-CSCF 3 of the second embodiment does not control the passage of a packet. Instead, the AS 1 judges whether to execute an application requested by a received packet in the second embodiment.

The second embodiment is characterized in that the AS 1 has a filtering measure that uses application identifiers in order to carry out the above-mentioned packet filtering by the AS 1.

Having the packet filtering measure, the AS 1 is capable of performing packet filtering that uses application identifiers (PSI-based filtering) when a signal is received from the S-CSCF 3.

A communication network according to the second embodiment of this invention is similar to the communication network of the first embodiment shown in FIG. 1, and therefore will not be described here. What is described here is the difference between the second embodiment and first embodiment of this invention.

The memory 37 of the S-CSCF 3 in the second embodiment does not have the PSI filter reference program 50, the PSI filter update program 80, the PSI filter update program (session termination) 90, and the PSI filter information table 210.

The memory 17 of the AS 1 in the second embodiment has a PSI filter program 270 in addition to the components described in the first embodiment.

Figure 17:
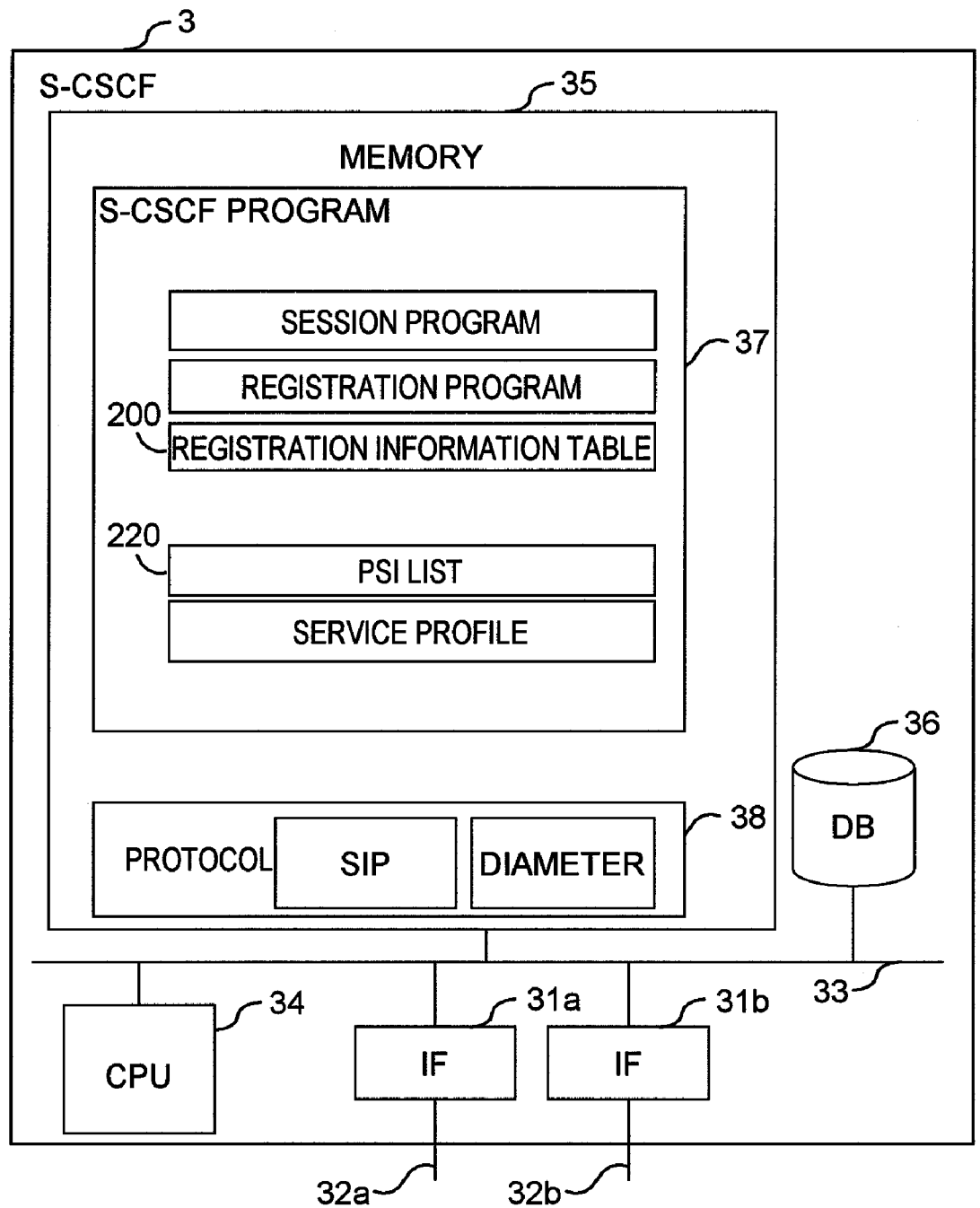
FIG. 17 is an explanatory diagram showing a configuration example of the S-CSCF according to the second embodiment of this invention.

FIG. 17 is an explanatory diagram showing a configuration example of the S-CSCF 3 according to the second embodiment of this invention.

The S-CSCF 3 of the second embodiment differs from that of the first embodiment shown in FIG. 2 in that the memory 37 does not need to store the PSI filter reference program 50, the PSI filter update program 80, the PSI filter update program (session termination) 90, and the PSI filter information table 210. The rest of the S-CSCF 3 in the second embodiment is the same as in the first embodiment, and a description thereof will be omitted here.

Figure 18:
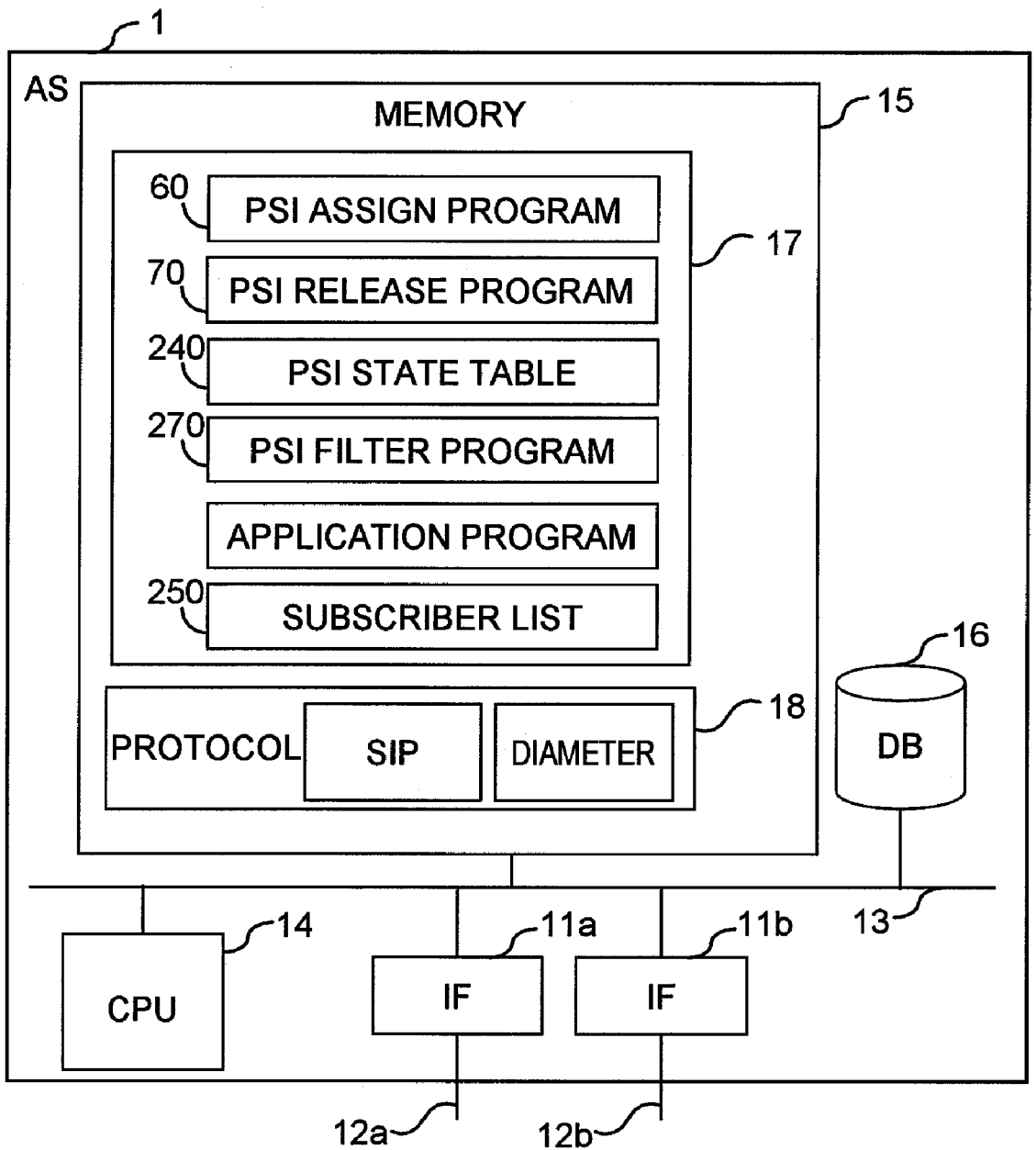
FIG. 18 is an explanatory diagram showing a configuration example of the AS according to the second embodiment of this invention.

FIG. 18 is an explanatory diagram showing a configuration example of the AS 1 according to the second embodiment of this invention.

In the second embodiment, the memory 17 of the AS 1 stores the programs 17 and 18 as in the first embodiment. The program 17 of the second embodiment further contains the PSI filter program 270. The PSI state table 240 in the second embodiment holds, in addition to a PSI that is dynamically allocated by the AS 1, a PSI that is set in advance (for example, "conference_factory@as1.home1.net"). Except the memory 17, the AS 1 in the second embodiment has the same configuration as that of the AS 1 in the first embodiment.

The PSI filter program 270 will be described in detail with reference to FIG. 19. The AS 1 is capable of implementing a PSI-based filtering function by activating the PSI filter program 270 upon reception of a message.

Figure 19:
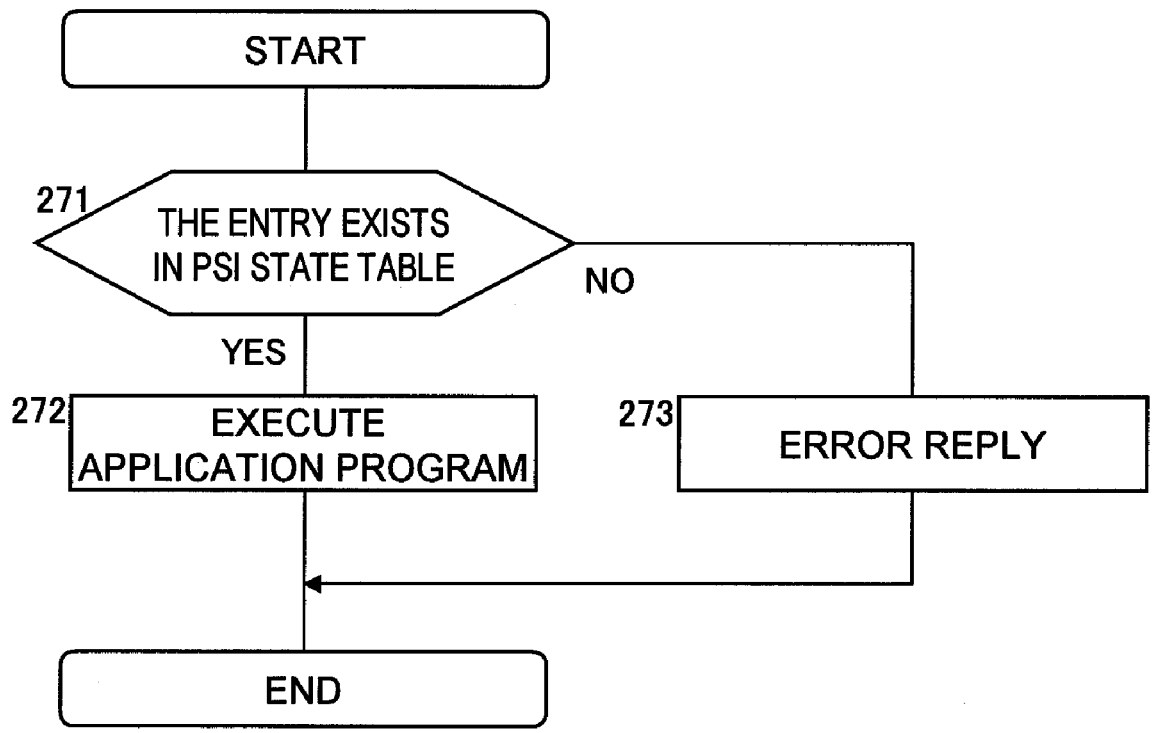
FIG. 19 is a flow chart illustrating the PSI filter processing routine which is used in application filtering according to the second embodiment of this invention.

FIG. 19 is a flow chart illustrating the PSI filter processing routine 270 which is used in application filtering according to the second embodiment of this invention.

The PSI filter processing routine 270 is actually executed by the CPU 14 of the AS 1, as is the case for the PSI assign processing routine 60 and other routines described above.

This routine 270 is activated when the AS 1 receives a session control message.

The AS 1 first searches the PSI state table 240 using as a search key a PSI that is contained in the received session control message, and judges whether or not an entry that holds the search key PSI is in the PSI state table 240 (271). The AS 1 executes an application only when an entry that meets the search criterion of Step 271 is found (272). When no entry meets the search criterion, the AS 1 sends an error response (273).

Through the above-mentioned processing, when receiving a packet, the AS 1 can use the public address of the UE 7 and an application identifier (PSI) as packet filtering criteria. In other words, the AS 1 can provide access control using PSI.

The UE 7 is registered in the second embodiment through the same procedure that is employed in the first embodiment and shown in FIG. 6.

Figure 20:
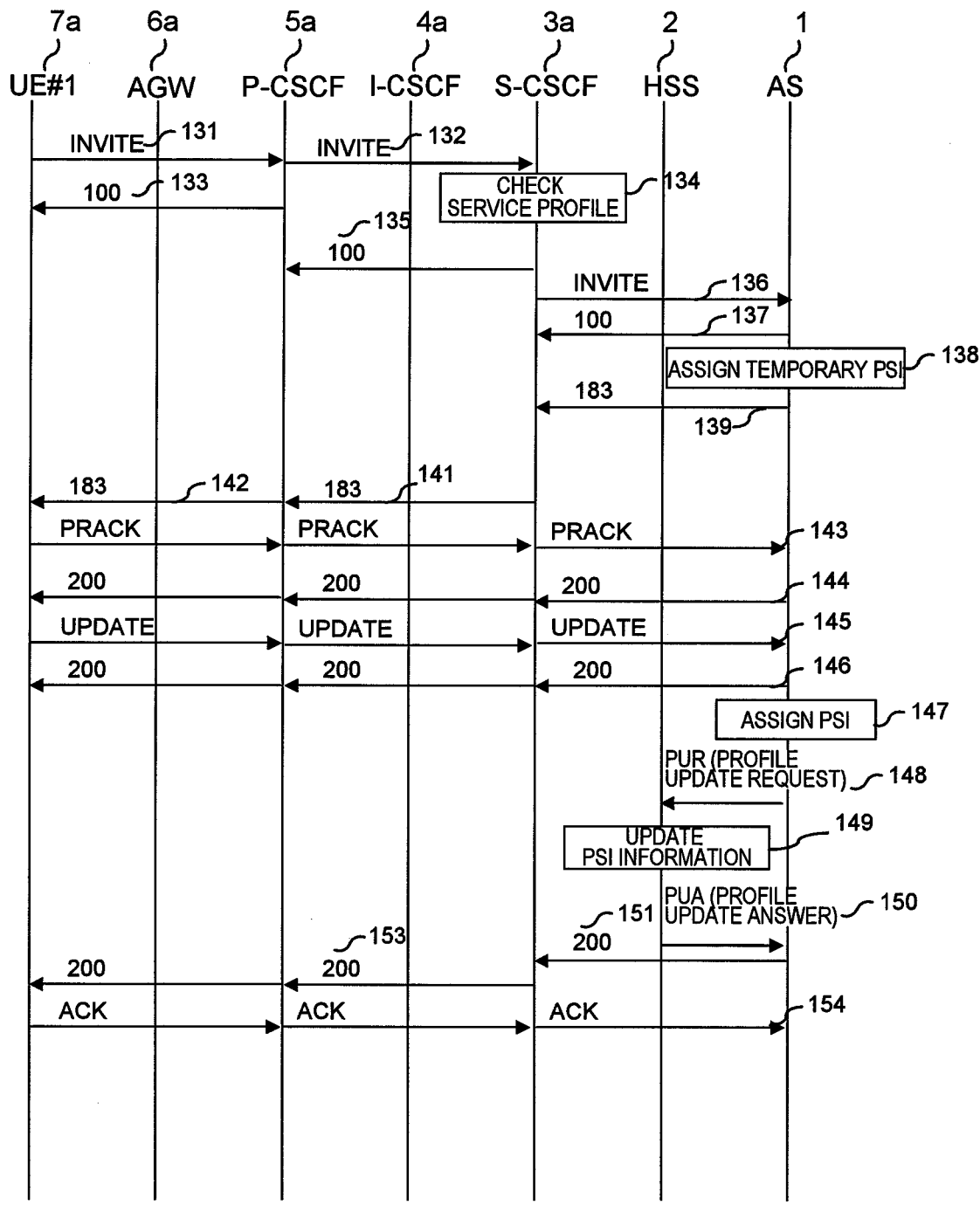
FIG. 20 is a sequence diagram illustrating a procedure through which the UE 7a activates an application (conference service) according to the second embodiment of this invention.

FIG. 20 is a sequence diagram illustrating a procedure through which the UE 7a activates an application (conference service) according to the second embodiment of this invention.

Some steps of the procedure shown in FIG. 20 are the same as those in FIG. 7, and a description on those steps will be omitted here.

The S-CSCF 3a of this embodiment does not execute Steps 155, 140, 156, 157, and 160 shown in FIG. 7. Also, the S-CSCF 3a of this embodiment does not execute the PSI filter update processing routine 80 of FIG. 13 in Steps 144, 146, and 151. Instead, the AS 1 executes the PSI filter processing routine 270 of FIG. 19 in Steps 136, 143, 145, and 154.

Figure 21:
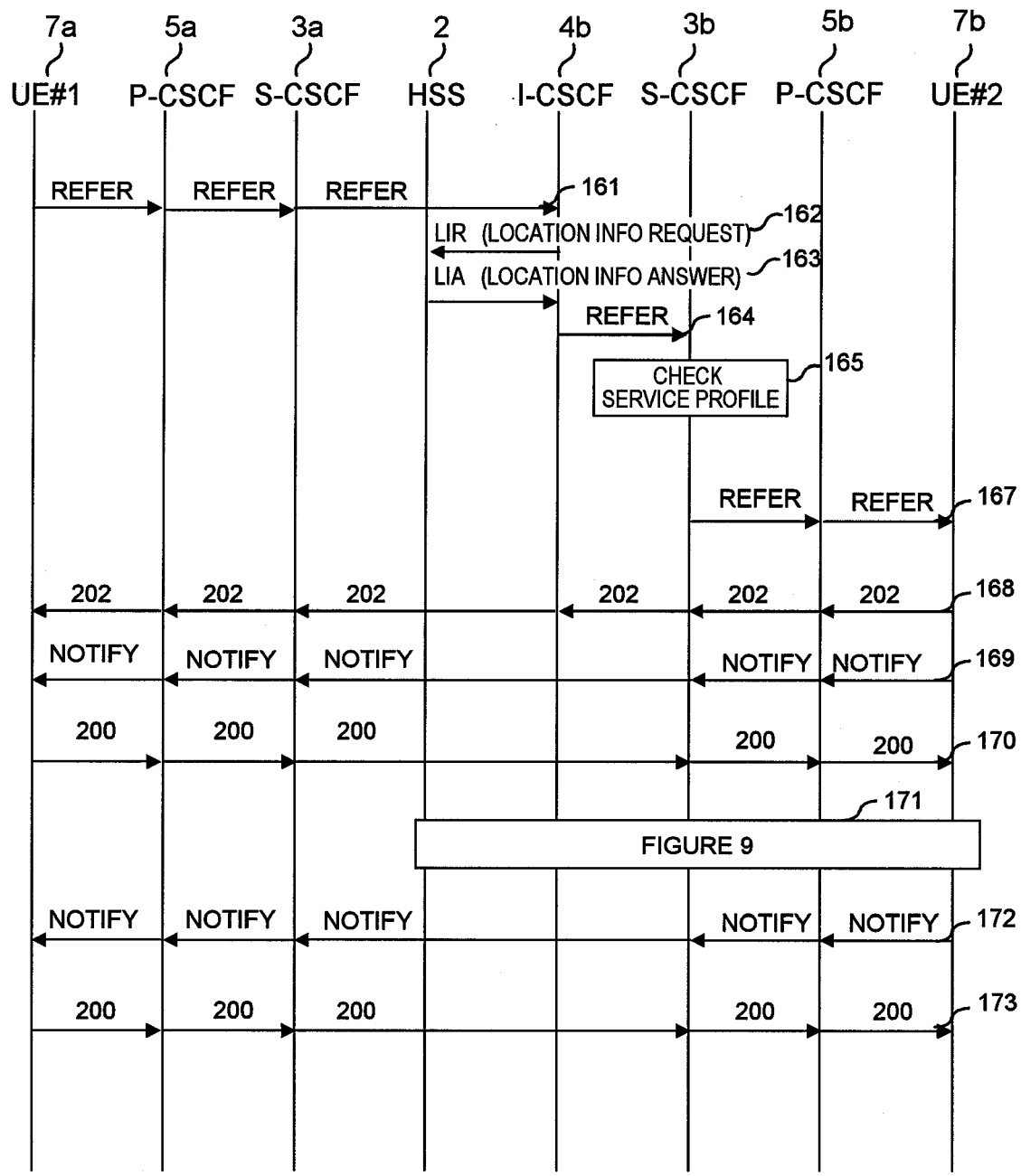
FIG. 21 is a sequence diagram illustrating a procedure through which the UE 7a calls the UE 7b to a conference service according to the second embodiment of this invention.

FIG. 21 is a sequence diagram illustrating a procedure through which the UE 7a calls the UE 7b to a conference service according to the second embodiment of this invention.

Some steps of the procedure shown in FIG. 21 are the same as those in FIG. 8, and a description on those steps will be omitted here.

The S-CSCF 3b of this embodiment does not execute Step 166 shown in FIG. 8. Also, the S-CSCF 3b of this embodiment does not execute the PSI filter reference processing routine 50 of FIG. 12 in Steps 168, 169, 170, 172, and 173.

Figure 22:
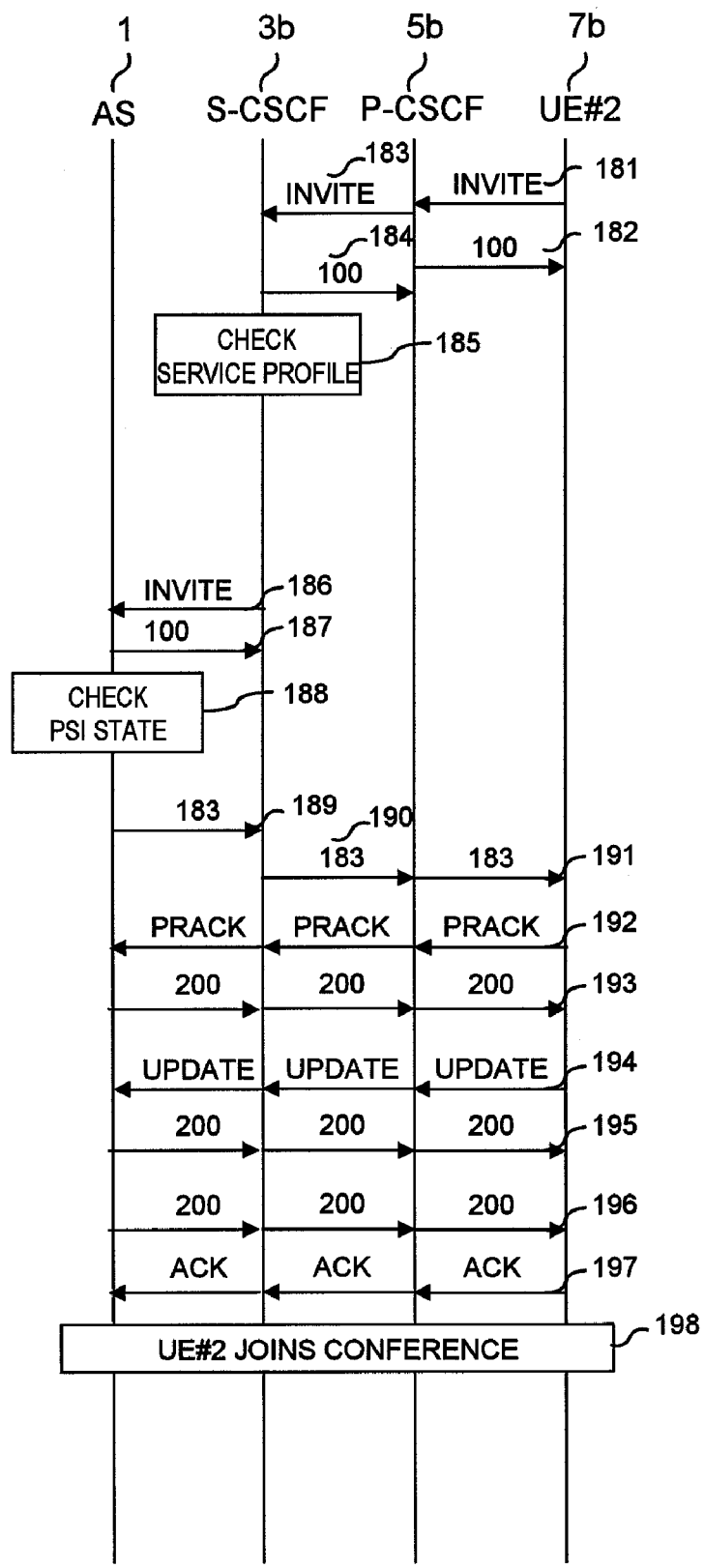
FIG. 22 is a sequence diagram illustrating a procedure through which the UE 7b joins a conference service according to the second embodiment of this invention.

FIG. 22 is a sequence diagram illustrating a procedure through which the UE 7b joins a conference service according to the second embodiment of this invention.

Some steps of the procedure shown in FIG. 22 are the same as those in FIG. 9, and a description on those steps will be omitted here.

The S-CSCF 3b of this embodiment does not execute Step 199 shown in FIG. 9. Also, the S-CSCF 3b of this embodiment does not execute the PSI filter reference processing routine 50 of FIG. 12 in Steps 192, 194, and 197. The S-CSCF 3b of this embodiment does not execute the PSI filter update processing routine 80 of FIG. 13 in Steps 187, 189, 193, 195, and 196. Instead, the AS 1 executes the PSI filter processing routine 270 of FIG. 19 in Steps 186, 192, 194, and 197.

Figure 23:
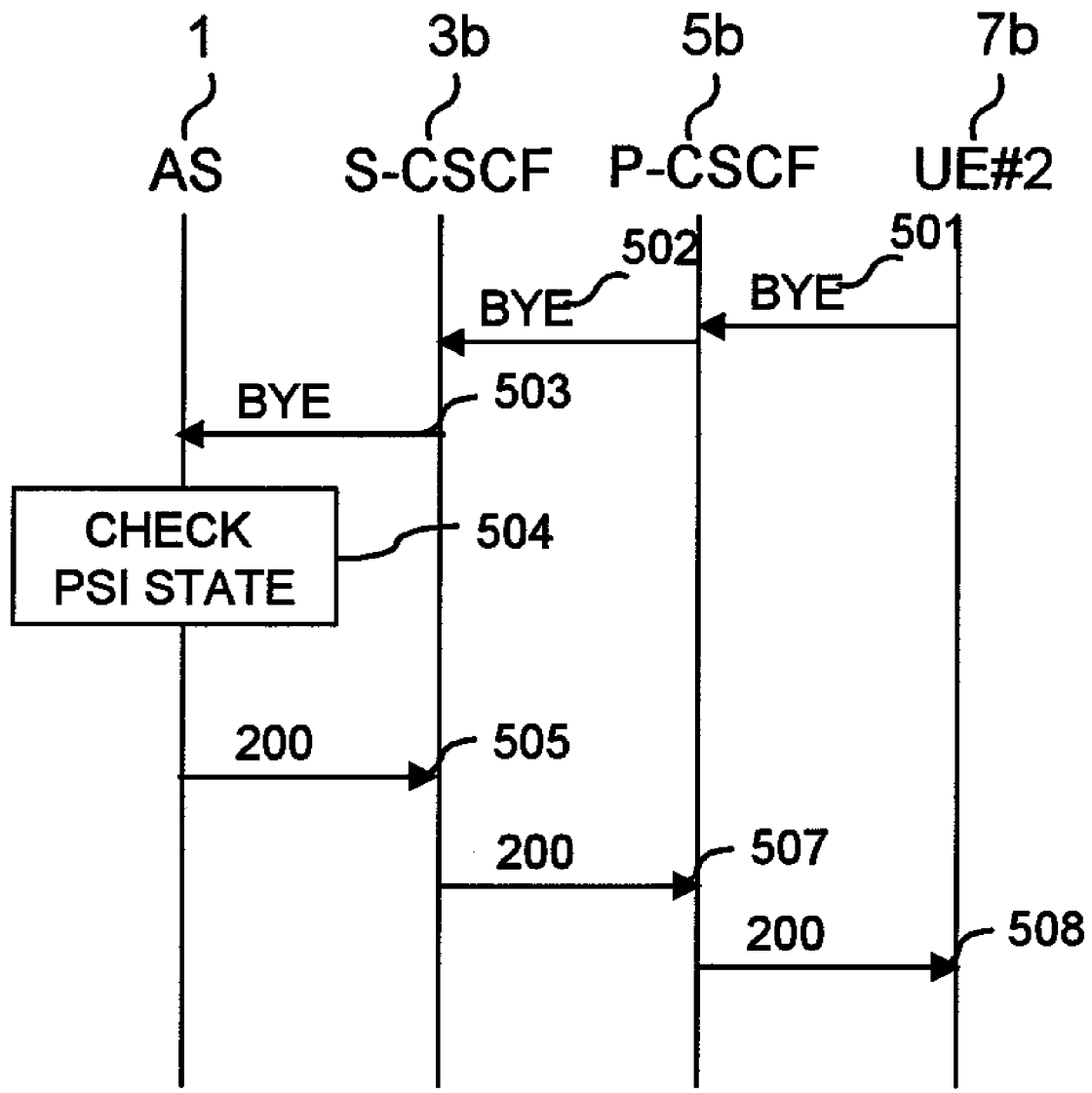
FIG. 23 is a sequence diagram illustrating a procedure through which the UE 7b leave a conference service according to the second embodiment of this invention.

FIG. 23 is a sequence diagram illustrating a procedure through which the UE 7b leave a conference service according to the second embodiment of this invention.

Some steps of the procedure shown in FIG. 23 are the same as those in FIG. 10, and a description on those steps will be omitted here.

The S-CSCF 3b of this embodiment does not execute Step 506 shown in FIG. 10. Also, the S-CSCF 3b of this embodiment does not execute the session end PSI filter update processing routine 90 of FIG. 14 in Steps 502.

Figure 24:
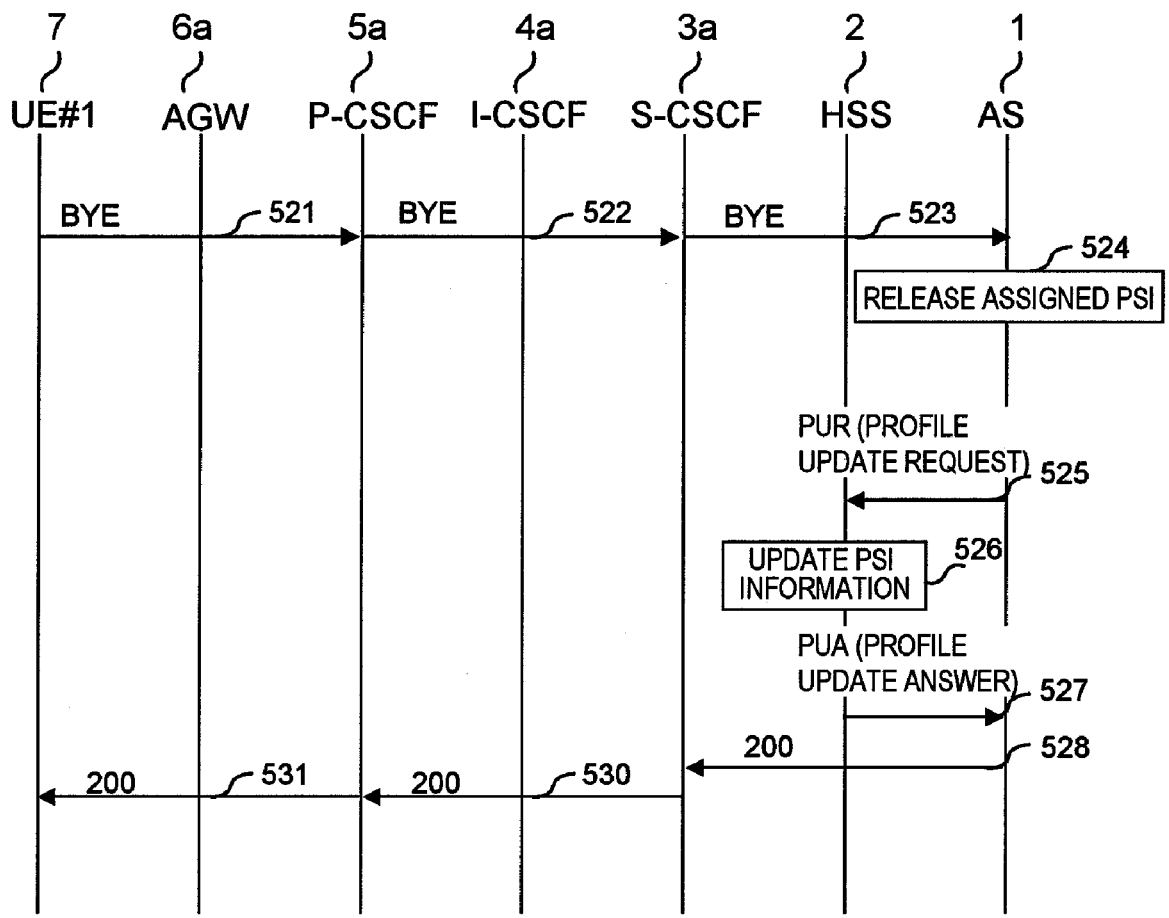
FIG. 24 is a sequence diagram illustrating a procedure through which the UE 7a stops subscribing to a conference service according to the second embodiment of this invention.

FIG. 24 is a sequence diagram illustrating a procedure through which the UE 7a stops subscribing to a conference service according to the second embodiment of this invention.

Some steps of the procedure shown in FIG. 24 are the same as those in FIG. 11, and a description on those steps will be omitted here.

The S-CSCF 3a of this embodiment does not execute Step 529 shown in FIG. 11. Also, the S-CSCF 3a of this embodiment does not execute the session end PSI filter update processing routine 90 of FIG. 14 in Step 522.

As has been described, according to the second embodiment of this invention, the AS 1 prevents invalid access to the AS 1 by activating the PSI filter processing routine 270 upon reception of a packet instead of the S-CSCF 3 executing PSI-based filtering.

The S-CSCF 3 and the HSS 2 in this embodiment may be implemented by the same communication device.

Alternatively, the S-CSCF 3 and the AS 1 in this embodiment may be implemented by the same device. It is even possible in this embodiment to implement the S-CSCF 3, the AS 1, and the HSS 2 with one device. Also, the S-CSCF 3, the I-CSCF 4, and the P-CSCF 5 in this embodiment may be implemented by the same device.

The AS 1 in the second embodiment of this invention manages PSI information about which UE 7 uses which PSI, and executes packet filtering based on the PSI information. The AS 1 can thus provide a PSI-based packet filtering function, and the S-CSCF 3 does not need to have a PSI-based filtering function.

A third embodiment of this invention will be described next with reference to drawings.

Figure 25:
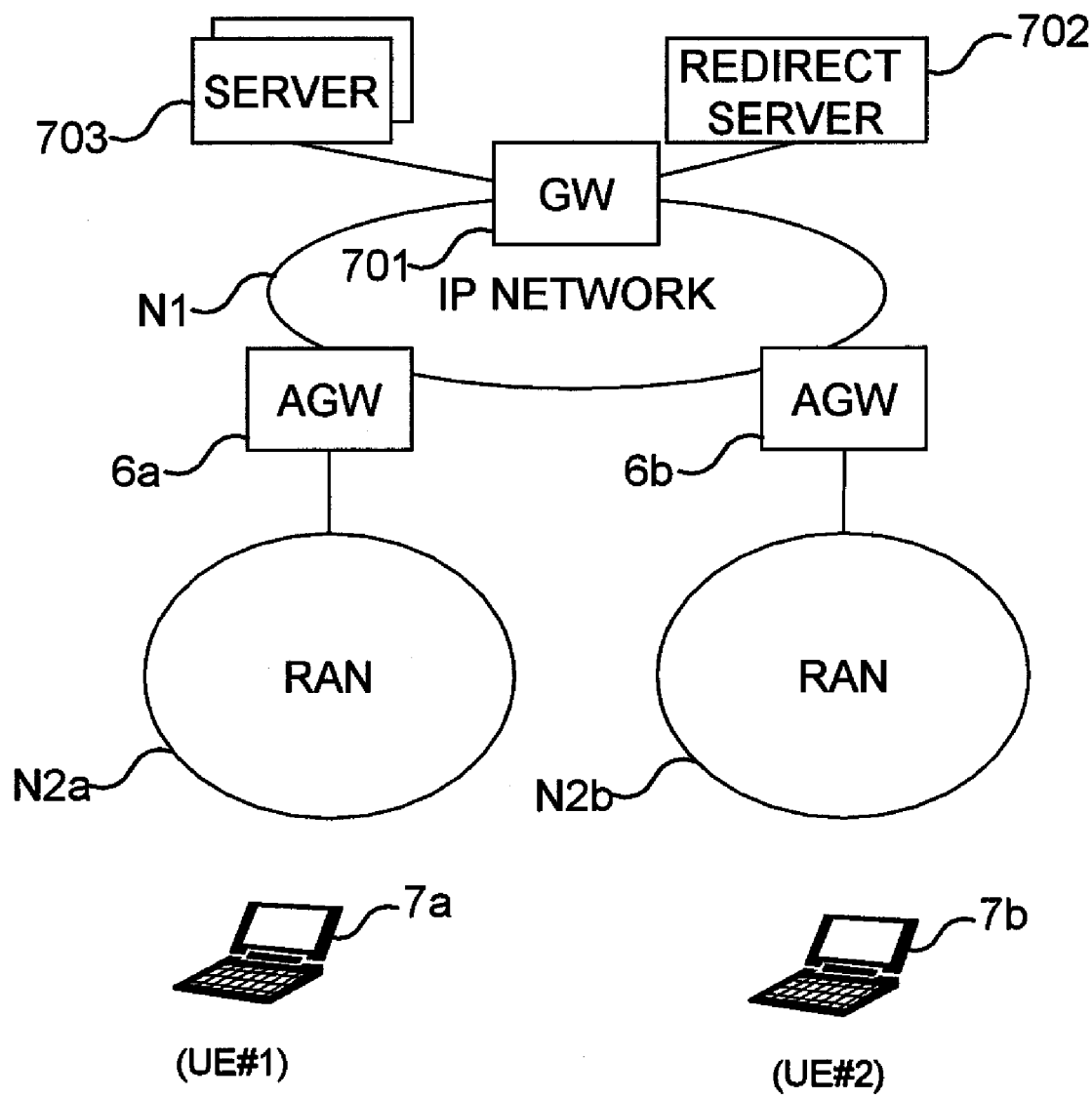
FIG. 25 is an explanatory diagram showing a configuration example of a communication network according to the third embodiment of this invention.

FIG. 25 is an explanatory diagram showing a configuration example of a communication network according to the third embodiment of this invention.

The premise of the first embodiment of this invention is that the UE 7 has communications compliant with PSI. Accordingly, the S-CSCF 3 and other SIP servers control the exchange of SIP messages in the first embodiment. However, this invention is also applicable to other protocols than PSI. The third embodiment of this invention shows an example of carrying out this invention when the UE 7 has communications compliant with HTTP. Note that HTTP is merely given as an example, and that this invention can be carried out also when other protocols are employed.

The communication network in this embodiment is composed of the IP network N1 and the wireless access networks N2 (N2a, N2b) (RAN: Radio Access Network). The UE 7 is a terminal compliant with a third-generation mobile communication protocol. The wireless access networks N2 may be landline networks and the UE 7 may be a landline terminal or a wireless terminal compliant with other mobile communication protocols than third-generation mobile communication protocols, for example, wireless LAN, as long as such modifications to the communication network configuration do not impair the effects of this invention.

The IP network N1 is connected with the RANs N2 via access gate way devices (AGW) 6 (6a, 6b). Other communication devices than the access gateway devices 6, for example, routers, may connect the IP network N1 with the RANs N2. Each access gateway device 6 provides the function of transferring IP packets that are exchanged between the UE 7 and the IP network N1.

The IP network N1 has a gateway device (GW) 701, a redirect server 702, and a server 703.

The redirect server 702 has a function of sending, upon receiving an HTTP request from the UE 7, information on the server 703 that provides an application to this UE 7 (redirecting function).

The server 703 has a function of controlling execution of an application.

The gateway device (GW) 701 receives from the redirect server 702 identification information of an application that is provided in the server 703 with which the GW 701 communicates. The GW 701 associates the received application identification information with identification information of the terminal UE 7, and keeps information about the correlation as the S-CSCF 3 does in the first embodiment. This information can be the same information as the PSI filter information table 210 of the first embodiment, for example.

The GW 701 refers to the correlation information upon receiving a request directed to the server 703, and judges whether or not access to the server 703 should be granted as the S-CSCF 3 does in the first embodiment.

The GW 701 thus has functions similar to those of the S-CSCF 3 of the first embodiment, and can therefore provide a packet filtering function using application identifiers when a signal is received from the UE 7.

A fourth embodiment of this invention will be described next with reference to drawings.

Figure 26:
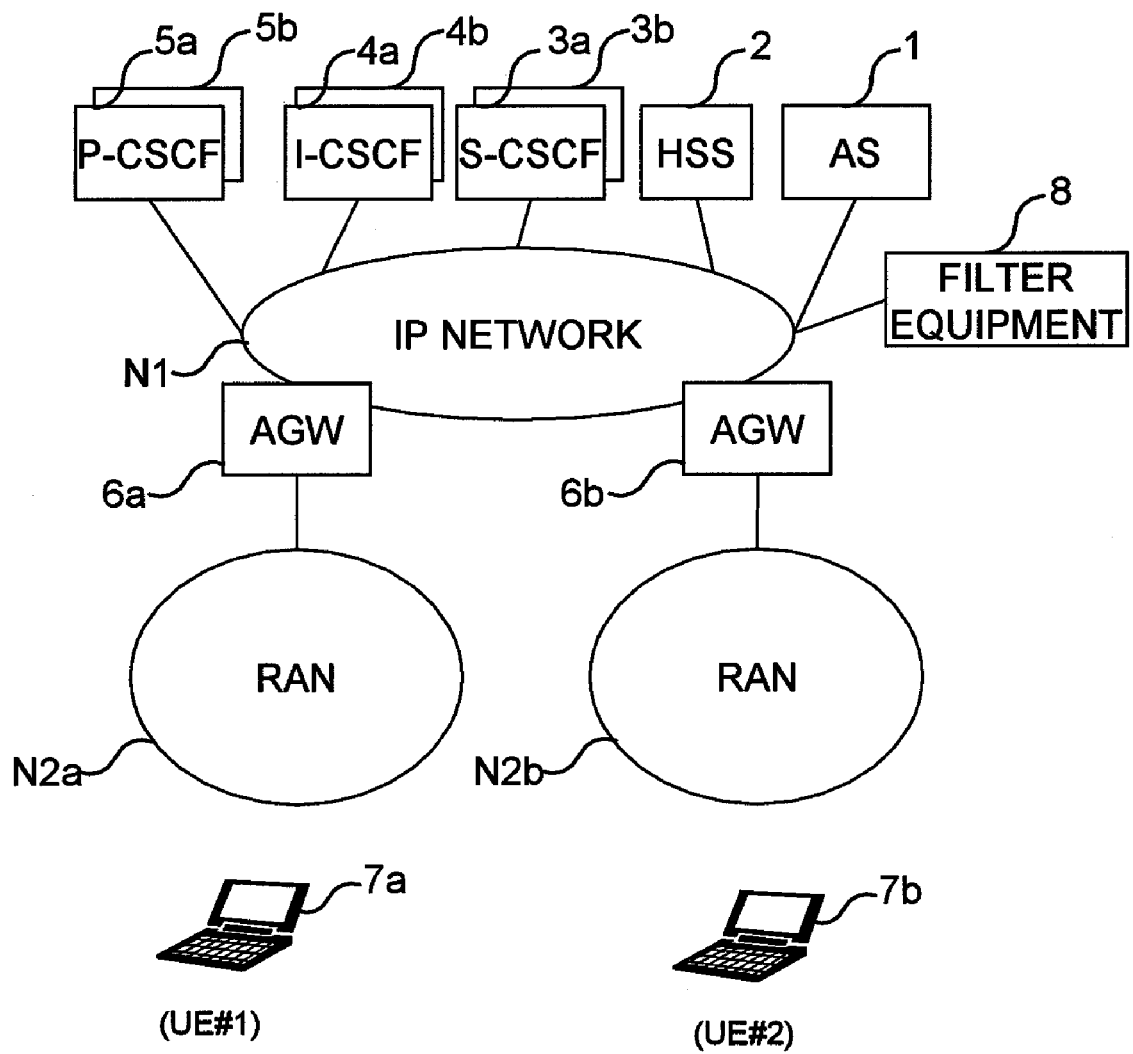
FIG. 26 is an explanatory diagram showing a configuration example of a communication network according to the fourth embodiment of this invention.

FIG. 26 is an explanatory diagram showing a configuration example of a communication network according to the fourth embodiment of this invention.

The communication network in the fourth embodiment differs from the one in the first embodiment in that a filter equipment 8 is connected to the IP network N1.

The filter equipment 8 has at least an interface connected to the IP network N1, a CPU connected to the interface, and a memory connected to the CPU. The interface, the CPU, and the memory are not shown in the drawing.

The CPU is a processor that executes programs stored in the memory.

The memory is similar to the memory 35 in the S-CSCF 3 of the first embodiment in that it stores a PSI filter reference program, a PSI filter update program, a PSI filter update program (session termination), a PSI filter information table, and a PSI list. Those processing programs and table and list are used for packet filtering as described in the first embodiment.

The filter equipment 8 thus executes the processing for packet filtering. In this way, the packet filtering function and the primary function of the S-CSCF 3 can thus be mounted in separate devices.

As has been described, according to the embodiments of this invention, a communication control device having an SIP communication function receives a message that contains an application identifier created by an application server, associates the application identifier with the identifier of a terminal, and stores this correlation information. The communication control device having the SIP communication function refers to the correlation information upon receiving an SIP message from the terminal, and controls access to the application server accordingly. The communication control device having the SIP communication function can thus provide access control that uses dynamically created identifiers. As a result, access to the application server is denied when an invalid application identifier is used.

This invention enables a communication device to provide access control that is based on application identifiers and terminal identifiers (e.g., public address). This invention can be applied in cases where a communication device in a communication network that contains mobile communication terminals or landline terminals performs access control based on application identifiers.

While the present invention has been described in detail and pictorially in the accompanying drawings, the present invention is not limited to such detail but covers various obvious modifications and equivalent arrangements, which fall within the purview of the appended claims.

What is claimed is:

1. An application filtering apparatus for controlling a session, which is coupled to a network which is coupled to a plurality of terminal devices, a first server for managing subscriber information of the terminal devices, and a second server for providing a service to the terminal devices,
   the application filtering apparatus comprising:
      an interface coupled to the network;
      a processor coupled to the interface; and
      a memory coupled to the processor,
   wherein the application filtering apparatus is configured to:
      obtain the subscriber information from the first server;
      obtain, when one of the terminal devices sends a session control message to the second server, an identifier of the terminal device that has sent the received session control message;
      send, based on the obtained subscriber information and the obtained identifier of the terminal device, an instruction to activate the service to the second server via the interface;
      store, in the memory, information indicating a correlation between the obtained identifier of the terminal device and an identifier of the second server;
      receive a response to the instruction to activate the service from the second server;
      obtain, from the received response, an identifier of the service to be activated, which is created by the second server which receives the instruction to activate the service;
      store, in the memory, information indicating a correlation between the obtained identifier of the terminal device and the obtained identifier of the service; and
      control access to the second server from the terminal device based on the information on the correlation between the identifier of the terminal device and the identifier of the second server which is stored in the memory.

2. The application filtering apparatus according to claim 1,
   wherein the subscriber information includes information that indicates whether the terminal device is entitled to receive the service provided by the second server,
   wherein the application filtering apparatus is further configured to:
   judge whether or not the terminal device that has sent the session control message is entitled to receive the service provided by the second server based on the obtained subscriber information and the obtained identifier of the terminal device; and
   send, when it is judged that the terminal device that has sent the session control message has a right to receive the service provided by the second server, the session control message to the second server via the interface, with an instruction to control the service attached to the session control message.

3. The application filtering apparatus according to claim 1, further configured to delete the information indicating the correlation between the identifier of the terminal device and the identifier of the second server from the memory when the provision of the service ends.

4. The application filtering apparatus according to claim 1, further configured to send, when a session control message is received from one of the terminal devices, and when a correlation between the identifier of the terminal device of the terminal device that has sent the received session control message and the identifier of the second server of the second server to which the received session control message is directed matches the correlation that is indicated by the information stored in the memory, the received session control message to the second server.

5. A communication system for controlling communications over a network, comprising:
  a plurality of terminal devices coupled to the network;
  a first server coupled to the network, for managing subscriber information of the terminal devices;
  a second server coupled to the network, for providing a service to the terminal devices; and
  a session control device,
  wherein the session control device has an interface coupled to the network, a processor coupled to the interface, and a memory coupled to the processor, and
  wherein the session control device is configured to:
  obtain the subscriber information from the first server;
  obtain, when one of the terminal devices sends a session control message to the second server, an identifier of the terminal device that has sent the received session control message;
  send, based on the obtained subscriber information and the obtained identifier of the terminal device, an instruction to activate the service to the second server via the interface;
  store, in the memory, information indicating a correlation between the obtained identifier of the terminal device and an identifier of the second server;
  receive a response to the instruction to activate the service from the second server;
  obtain, from the received response, an identifier of the service to be activated, which is created by the second server which receives the instruction to activate the service;
  store, in the memory, information indicating a correlation between the obtained identifier of the terminal device and the obtained identifier of the service; and
  control access to the second server from the terminal device based on the information on the correlation between the identifier of the terminal device and the identifier of the second server which is stored in the memory.

6. The communication system according to claim 5,
  wherein the subscriber information includes information that indicates whether the terminal device is entitled to receive the service provided by the second server, and
  wherein the session control device:
  judges whether or not the terminal device that has sent the session control message is entitled to receive the service provided by the second server based on the obtained subscriber information and the obtained identifier of the terminal device; and
  sends, when it is judged that the terminal device that has sent the session control message has a right to receive the service provided by the second server, the session control message to the second server via the interface, with an instruction to control the service attached to the session control message.

7. The communication system according to claim 5, wherein the session control device is further configured to delete the information indicating the correlation between the identifier of the terminal device and the identifier of the second server from the memory when the provision of the service ends.

8. The communication system according to claim 5, wherein, when a session control message is received from one of the terminal devices, and when a correlation between the identifier of the terminal device of the terminal device that has sent the received session control message and the identifier of the second server of the second server to which the received session control message is directed matches the correlation that is indicated by the information stored in the memory, the session control device sends the received session control message to the second server.

9. A method of controlling communications executed in a communication system, which include a plurality of terminal devices, a first server, a second server, and a session control device which are coupled to a network, the first server managing subscriber information of the terminal devices, the second server providing a service to the terminal devices, comprising:
  obtaining the subscriber information from the first server;
  obtaining, when one of the terminal devices sends a session control message to the second server, an identifier of the terminal device that has sent the received session control message;
  sending, based on the obtained subscriber information and the obtained identifier of the terminal device, an instruction to activate the service to the second server via an interface of the session control device;
  holding information indicating a correlation between the obtained identifier of the terminal device and an identifier of the second server;
  receiving a response to the instruction to activate the service from the second server;
  obtaining an identifier of the service to be activated, which is created by the second server which receives the instruction to activate the service;
  holding information that indicates a correlation between the obtained identifier of the terminal device and an identifier of the service; and
  controlling access to the second server from the terminal device based on the held information that indicates the correlation between the identifier of the terminal device and the identifier of the second server.

* * * * *